(12) United States Patent
Watanabe et al.

(10) Patent No.: US 8,185,308 B2
(45) Date of Patent: May 22, 2012

(54) ANGULAR VELOCITY CORRECTING DEVICE, ANGULAR VELOCITY CORRECTING METHOD, AND NAVIGATION DEVICE

(75) Inventors: Takayuki Watanabe, Fukushima (JP); Kotaro Wakamatsu, Fukushima (JP); Takehiko Sakagami, Fukushima (JP); Koji Sewaki, Fukushima (JP)

(73) Assignee: Alpine Electronics Inc., Tokyo (JP)

( * ) Notice: Subject to any disclaimer, the term of this patent is extended or adjusted under 35 U.S.C. 154(b) by 682 days.

(21) Appl. No.: 12/268,845

(22) Filed: Nov. 11, 2008

(65) Prior Publication Data

US 2009/0150075 A1 Jun. 11, 2009

(30) Foreign Application Priority Data

Dec. 6, 2007 (JP) ................................ 2007-315918

(51) Int. Cl.
*G01C 21/00* (2006.01)
(52) U.S. Cl. ........................................................ 701/469
(58) Field of Classification Search .................. 701/214, 701/1, 469
See application file for complete search history.

(56) References Cited

U.S. PATENT DOCUMENTS

| | | | | |
|---|---|---|---|---|
| 6,782,315 B2 * | 8/2004 | Lu et al. | ........................... | 701/45 |
| 7,747,383 B2 * | 6/2010 | Ohkubo et al. | ............... | 701/200 |
| 2004/0204798 A1 * | 10/2004 | Imada et al. | ...................... | 701/1 |
| 2006/0058945 A1 * | 3/2006 | Watanabe | ..................... | 701/200 |
| 2007/0078594 A1 * | 4/2007 | Mori | .............................. | 701/207 |

FOREIGN PATENT DOCUMENTS

| | | |
|---|---|---|
| JP | 2006-071474 | 3/2006 |
| JP | 2008-216226 | 9/2008 |

* cited by examiner

*Primary Examiner* — Thomas G. Black
*Assistant Examiner* — Shardul Patel
(74) *Attorney, Agent, or Firm* — Brinks Hofer Gilson & Lione

(57) ABSTRACT

Angular velocity correcting devices, angular velocity correcting methods, and navigation devices are disclosed. In some implementations, a first sensor sensitivity correcting method for considering variation of sensor sensitivity due to an oblique angle of an angular velocity detecting sensor with respect to a horizontal plane and a sensitivity error of the angular velocity detecting sensor and correcting the sensor sensitivity is enabled. A second sensor sensitivity correcting method for considering the variation of the sensor sensitivity due to the oblique angle of the angular velocity detecting sensor with respect to the horizontal plane without considering the sensitivity error and correcting the sensor sensitivity is enabled. The sensitivity error is calculated on the basis of a ratio of the sensor sensitivity obtained by the first sensor sensitivity correcting method to the sensor sensitivity obtained by the second sensor sensitivity correcting method. The angular velocity from the angular velocity detecting sensor using the sensitivity error is corrected.

17 Claims, 15 Drawing Sheets

$A_{car} - A_{acc} = G \cdot \sin\theta_{acc}$

ANGULAR VELOCITY CORRECTING DEVICE, ANGULAR VELOCITY CORRECTING METHOD, AND NAVIGATION DEVICE

RELATED APPLICATIONS

The present application claims priority to Japanese Patent Application Serial Number 2007-315918, filed Dec. 6, 2007, the entirety of which is hereby incorporated by reference.

FIELD OF THE INVENTION

The present invention relates to angular velocity correcting devices, angular velocity correcting methods, and navigation devices, and in particular, relates to an angular velocity correcting device, an angular velocity correcting method, and a navigation device for correcting the error of an angular velocity signal output from a gyroscope (an angular velocity error due to, for example, a sensor mounting pitch angle, a vehicle pitch angle, and the sensitivity error of a sensor).

BACKGROUND OF THE INVENTION

In general, an in-vehicle navigation device detects a current position of a vehicle, using, for example, a self-contained navigation sensor or a Global Positioning System (GPS) receiver; reads map data associated with the detected position and a neighborhood associated with the detected position from a recording medium; and displays the map data on a screen. Then, the in-vehicle navigation device displays a vehicle position mark that indicates the position of a vehicle, the vehicle position mark being superimposed on a predetermined position on the screen, so that it can be determined at a glance where the vehicle is currently driving.

A self-contained navigation sensor includes a vehicle speed sensor (a distance sensor) that detects a moving distance of a vehicle by outputting a pulse for each predetermined travel distance and an angular velocity sensor, such as a vibrating gyro, that detects a rotation angle (the moving orientation) of the vehicle. A self-contained navigation sensor detects a relative position and relative orientation of a vehicle using a vehicle speed sensor and an angular velocity sensor. In this case, for an angular velocity sensor, a plane associated the angular velocity that needs to be detected needs to be parallel to a plane on which the angular velocity sensor actually rotates. When the planes are not parallel to each other, the output sensitivity of the angular velocity sensor deviates from a genuine sensitivity.

In general, an angular velocity sensor is adjusted so that the angular velocity sensor can accurately determine the travel direction with the output sensitivity achieved when the angular velocity sensor is horizontally mounted. Thus, when an angular velocity sensor forms an angle with the horizontal direction, a relationship between angular velocity applied to the angular velocity sensor and the output sensitivity changes, so that the angular velocity sensor cannot accurately detect the travel direction of a vehicle. Accordingly, it is necessary to perform sensitivity correction corresponding to an inclination of the angular velocity sensor with respect to the horizontal direction.

Previously, this sensitivity correction has been performed as described below. When radio waves can be satisfactorily received from a GPS satellite, GPS orientation obtained by a GPS receiver as an absolute orientation is compared with a gyro orientation calculated from angular velocity obtained by an angular velocity sensor; the sensitivity of the angular velocity sensor is corrected so that the angular velocity agrees with the variation of the GPS orientation; and then angular velocity correction is performed using the corrected sensitivity. (See, for example, Japanese Unexamined Patent Application Publication No. 2006-71474).

FIG. 14 is a block diagram of an angular velocity correcting device according to such known art. The angular velocity correcting device includes a self-contained navigation sensor 1, a position-and-orientation calculating unit 2, a GPS receiver 3, a memory controller 4, a random access memory (RAM) (a travel history storage unit) 5, and a processor 6.

The self-contained navigation sensor 1 measures the current position of a vehicle and includes a distance sensor (a vehicle speed sensor) 1a and an angular velocity sensor (a relative orientation sensor) 1b such as a vibrating gyro. The distance sensor 1a detects the moving distance of a vehicle by outputting a pulse at predetermined intervals. The angular velocity sensor 1b detects angular velocity changing when a vehicle drives and integrates the detected angular velocity to output the rotation angle (the moving orientation) of the vehicle at predetermined intervals. The self-contained navigation sensor 1 detects the relative position and relative orientation of a vehicle using the distance sensor 1a and the angular velocity sensor 1b at predetermined intervals and sequentially outputs information on the relative position and relative orientation.

The position-and-orientation calculating unit 2 calculates, on the basis of information on the relative position and relative orientation of a vehicle output from the self-contained navigation sensor 1, an absolute vehicle position (an estimated vehicle position) and absolute vehicle orientation, and outputs the absolute vehicle position and the absolute vehicle orientation at predetermined intervals. Hereinafter, such an absolute position and absolute orientation calculated on the basis of the output from the self-contained navigation sensor 1 are called a gyro position and gyro orientation, respectively. In this case, the angular velocity sensor 1b and the position-and-orientation calculating unit 2 constitute an orientation sensor.

The GPS receiver 3 also measures the current position of a vehicle. The GPS receiver 3 receives radio waves sent from a plurality of GPS satellites (not shown) with a GPS antenna (not shown) and performs three-dimensional positioning or two-dimensional positioning to calculate the absolute position and absolute orientation of a vehicle at the same intervals as the self-contained navigation sensor 1 (the vehicle orientation is calculated on the basis of the current position of the vehicle and the position of the vehicle measured in the last sampling period $\Delta T$). Then, the GPS receiver 3 sequentially outputs information on the calculated absolute position and absolute orientation of the vehicle, together with positioning time. Hereinafter, an absolute position and absolute orientation calculated on the basis of the output from the GPS receiver 3 are called a GPS position and GPS orientation, respectively.

The memory controller 4 sequentially stores a gyro position and gyro orientation obtained by the position-and-orientation calculating unit 2 in the RAM 5 as the data of a set of travel histories obtained by the self-contained navigation sensor 1. Moreover, the memory controller 4 sequentially stores a GPS position and GPS orientation obtained by the GPS receiver 3 in the RAM 5 as the data of a set of travel histories obtained by the GPS receiver 3. Moreover, in response to a request from the processor 6, the memory controller 4 reads the data of each set of travel histories from the RAM 5 and supplies the data to the processor 6.

FIGS. 15A and 15B show exemplary travel history data stored in the RAM 5. FIG. 15A shows travel histories obtained by the GPS receiver 3. FIG. 15B shows travel histories obtained by the self-contained navigation sensor 1. In FIG. 15A, a black circle represents a GPS position output at predetermined intervals (for example, intervals of every two seconds), and an arrow represents GPS orientation output at predetermined intervals (for example, intervals of every two seconds). A GPS orientation is expressed by the sign of $\theta_{gps}n$ (n is 1, 2, ..., N where N is an integer).

In FIG. 15B, a white circle represents a gyro position output at predetermined intervals (for example, intervals of every two seconds), and an arrow represents gyro orientation output at predetermined intervals (for example, intervals of every two seconds). A gyro orientation is expressed by the sign of $\theta_{gyr}n$ (n is 1, 2, ..., N where N is an integer).

FIGS. 15A and 15B show that, when a vehicle turns to the left at an intersection, each GPS orientation indicates a relatively correct value, but each gyro orientation deviates from a correct value because the sensor sensitivity of the angular velocity sensor 1b has an error.

The processor 6 includes a first sampling unit 6a, a second sampling unit 6b, a sensitivity sample calculating unit 6c, and a statistical processing unit 6d. The first sampling unit 6a selectively extracts only orientation signals output when the following first conditions (1) to (3) are satisfied, where the first sampling unit 6a selectively extracts orientation signals from gyro orientation $\theta_{gyr}n$ (first orientation signals) and GPS orientation $\theta_{gps}n$ (second orientation signals) stored in the RAM 5 at predetermined intervals.

The first conditions are that:
(1) the speed of a vehicle that includes the angular velocity sensor 1b is greater than or equal to a threshold value (for example, 10 km/h);
(2) the reliability of a GPS is high; and
(3) curvature (or the rate of change of orientation) is low.

The condition (1) is set because, when the speed of a vehicle is low, in many cases, the error of GPS orientation is large. The speed of a vehicle can be obtained from the output of distance sensor 1a. Specifically, the speed of a vehicle can be obtained by dividing a distance between consecutive gyro positions stored in the RAM 5 as travel histories by the elapsed time (in seconds) between the consecutive gyro positions.

The condition (2) is set because, when the reliability of a GPS is low, in many cases, the error of GPS orientation is large. When the difference between the travel distance of a certain section obtained by the self-contained navigation sensor 1 (self-contained navigation travel distance) and the distance of a section corresponding to the certain section obtained by the GPS receiver 3 (inter-GPS-positioning-points distance) is less than or equal to a threshold value, it can be determined that the GPS reliability is high.

The condition (3) is set because, when curvature (the rate of change of orientation) is high, in many cases, the error of GPS orientation is large. The condition about curvature is that, for example, the variation of gyro orientation obtained by the angular velocity sensor 1b during a predetermined past period (for example, past thirty minutes) is less than or equal to a threshold value (for example, five degrees).

Hereinafter, data extracted on the basis of the aforementioned conditions is called first samples. In the aforementioned arrangement, all gyro orientations obtained by the position-and-orientation calculating unit 2 at predetermined intervals and GPS orientations obtained by the GPS receiver 3 at predetermined intervals are temporarily stored in the RAM 5, and then a portion of the stored orientations that meet the aforementioned conditions are extracted as first samples.

The second sampling unit 6b selectively extracts only gyro orientations and GPS orientations that satisfy the following second conditions (4) and (5), where the second sampling unit 6b extracts gyro orientations and GPS orientations from gyro orientations and GPS orientations extracted by the first sampling unit 6a.

(4) The time difference between two first samples set as targets when a first orientation differential angle and a second orientation differential angle described below are calculated is less than a threshold value. In detail, the elapsed time between the current first sample N and a target first sample i (i is N−1, N−2, ...) is less than or equal to a threshold value (for example, sixty seconds). This condition is set because, when the interval between samples subjected to the calculation is long, the error of gyro orientation due to the zero-point error of the angular velocity sensor 1b is large. A zero-point error represents the deviation of a reference voltage from a genuine voltage at a zero point due to the variation of the output voltage of the angular velocity sensor 1b caused by the influence of the ambient temperature.

(5) The GPS differential angle between the current first sample N and the target first sample i is less than or equal to a threshold value. The GPS differential angle is calculated by the following equation:

$$\text{GPS Differential Angle} = \theta_{gps}N - \theta_{gps}i. \quad (1)$$

This condition is set because, when the GPS differential angle is too small or large, the sensitivity error of the angular velocity sensor 1b does not become obvious, and thus it is difficult to accurately obtain the sensitivity error by calculation.

Hereinafter, data extracted on the basis of the aforementioned conditions is called second samples. The sensitivity sample calculating unit 6c calculates a plurality of sensitivity samples (the instantaneous value of sensitivity) from first orientation differential angles (gyro differential angles), each of which indicates the difference between gyro orientations extracted by the second sampling unit 6b and second orientation differential angles (GPS differential angles), each of which indicates the difference between GPS orientations extracted by the second sampling unit 6b.

A GPS differential angle is obtained by equation (1), as described above. On the other hand, a gyro differential angle is calculated by the following equation:

$$\text{Gyro Differential Angle} = \theta_{gyr}N - \theta_{gyr}i. \quad (2)$$

Moreover, a sensitivity sample of the angular velocity sensor 1b is calculated by the following equation:

$$\text{Sensitivity Sample} = \text{GPS Differential Angle} / \text{Gyro Differential Angle}. \quad (3)$$

In this case, a plurality of gyro differential angles and a plurality of GPS differential angles have been obtained. Thus, calculation according to equation (3) is performed on each set of a gyro differential angle and a GPS differential angle corresponding to each other to obtain a plurality of sensitivity samples.

The statistical processing unit 6d performs statistical processing of a plurality of sensitivity samples obtained by the sensitivity sample calculating unit 6c to calculate the sensor sensitivity of the angular velocity sensor 1b. For example, the moving average of the plurality of extracted sensitivity samples is output as sensor sensitivity A. In this case, a sensitivity sample of the deviation from the average that is large (for example, a sensitivity sample of the deviation that is less than or equal to 15%) may be regarded as an abnormal value and excluded. After discarding the abnormal value, the average may be recalculated to improve the accuracy of calculation. According to equation (3), the sensor sensitivity A is determined so that, when sensor orientation obtained from the angular velocity sensor 1b is corrected using the sensor sensitivity A, the corrected sensor orientation agrees with GPS orientation obtained from GPS radio waves.

The sensor sensitivity A is obtained in the aforementioned manner, and then an angular velocity correcting unit 7 corrects angular velocity $\omega_{gyro}$ output from the angular velocity sensor 1b using the sensor sensitivity A according to the following equation:

$$\omega_{gyro}' = \omega_{gyro} \times A.$$

In an angular velocity correcting device, the application of which has been filed by the applicant in the Japanese Patent Office on Mar. 8, 2007 (see, Japanese Unexamined Patent Application Publication No. 2007-58131), sensor sensitivity B is calculated to correct angular velocity according to the following steps (1) to (5):

(1) the oblique angle $\theta_{acc}$ of a gyro/acceleration sensor (an acceleration oblique angle) with respect to a horizontal plane is measured using signals output from a speed sensor (a distance sensor) and an acceleration sensor, and the oblique angle $\theta_{gps}$ of a vehicle (a GPS oblique angle) with respect to a horizontal line is measured using signals received by a GPS;

(2) a sensor oblique angle $\theta_{sensor}$ ($=\theta_{acc}-\theta_{gps}$) is obtained from the acceleration oblique angle $\theta_{acc}$ and the GPS oblique angle $\theta_{gps}$;

(3) a vehicle oblique angle $\theta_{car}$ ($=\theta_{acc}-\theta_{sensor}$) is obtained using the acceleration oblique angle $\theta_{acc}$ and the sensor oblique angle $\theta_{sensor}$;

(4) the sensor sensitivity B is determined using the sensor oblique angle $\theta_{sensor}$ and the vehicle oblique angle $\theta_{car}$ according to the following equation:

$$1/\cos(\theta_{sensor}+\theta_{car}); \text{ and}$$

(5) angular velocity is corrected using the sensor sensitivity B.

Angular velocity output from a gyroscope includes the following error factors (1) to (3):

(1) a sensor mounting pitch angle with respect to a vehicle, (2) a vehicle pitch angle with respect to a horizontal plane (the oblique angle of a road), and (3) the sensitivity error of the gyroscope (individual difference in characteristics due to, for example, a hardware factor). Thus, correction in which the error factors are considered needs to be performed.

In the known art shown in FIG. 14, when GPS radio waves cannot be received or when a vehicle moves in a multistory parking garage where the variation of the vehicle pitch angle (the vehicle oblique angle) is large, the sensitivity of a gyroscope cannot be calculated, and thus the gyro angular velocity cannot be corrected (the error factor (2) cannot be handled). Accordingly, an orientation shift occurs, so that the accuracy of the vehicle position in the multistory parking garage deteriorates. Moreover, returning to an actual driving road after exiting from the multistory parking garage by map matching is disadvantageously delayed.

Moreover, in the art disclosed in Japanese Unexamined Patent Application Publication No. 2007-58131, the sensitivity error of a gyroscope (individual difference in characteristics due to, for example, a hardware factor) cannot be accommodated. Thus, in a case where the sensitivity significantly deviates from a standard value, so that the specification limit is almost reached, when a vehicle turns to the left or right at an intersection, the detected amount of turn is insufficient or excessive, so that the accuracy of position and orientation of the vehicle deteriorates. Especially in a multistory parking garage where the orientation of the vehicle significantly changes in a short time, the accuracy of the position significantly deteriorates. For example, the standard value of sensitivity is 25 mV/(deg/s), and the allowable range of sensitivity according to specifications is between 23.25 mV/(deg/s) and 26.75 mV/(deg/s). The allowable range of sensitivity can be converted to an error ranging from +7.5% to −6.5%, i.e., a gyro angular velocity error occurs. Thus, for example, when it is assumed that a vehicle goes up and down in a five-story parking garage, the maximum error $\theta_{error}$ of the orientation of the vehicle that may occur when the vehicle exits from the parking garage is obtained by the following equation:

$$\theta_{error} = 360 \text{ deg} \times 5 \times 2 \times 7.5/100 = 270 \text{ deg}.$$

This results in delay in returning to a road after exiting from the parking garage. In this equation, a five represents five revolutions, and a two represents up and down movement.

SUMMARY OF THE INVENTION

Accordingly, it is an object of the present invention to provide an angular velocity correcting device, an angular velocity correcting method, and a navigation device that can handle the aforementioned error factors (1) to (3).

It is another object of the present invention to enable correction of gyro angular velocity even when GPS radio waves cannot be received or when a vehicle moves in a multistory parking garage where the variation of the vehicle pitch angle is large.

It is yet another object of the present invention to keep the accuracy of the position of a vehicle in a multistory parking garage and enable returning to an actual driving road immediately after exiting from the multistory parking garage.

Angular Velocity Correcting Method

Angular velocity correcting methods for correcting sensitivity of an angular velocity detecting sensor that is mounted in a vehicle and detects angular velocity of the vehicle and correcting angular velocity output from the angular velocity detecting sensor using the corrected sensitivity are provided. Some implementations of angular velocity correcting methods may include the steps of enabling a first sensor sensitivity correcting method and a second sensor sensitivity correcting method, the first sensor sensitivity correcting method for considering variation of sensor sensitivity due to an oblique angle of the angular velocity detecting sensor with respect to a horizontal plane and a sensitivity error of the angular velocity detecting sensor and correcting the sensor sensitivity, and the second sensor sensitivity correcting method for considering the variation of the sensor sensitivity due to the oblique angle of the angular velocity detecting sensor with respect to the horizontal plane without considering the sensitivity error of the angular velocity detecting sensor and correcting the sensor sensitivity; calculating the sensitivity error of the angular velocity detecting sensor on the basis of a ratio of the sensor sensitivity obtained by the first sensor sensitivity correcting method to the sensor sensitivity obtained by the second sensor sensitivity correcting method; and correcting the angular velocity output from the angular velocity detecting sensor using the sensitivity error.

In angular velocity correcting methods, the sensor sensitivity may be corrected by multiplying the sensor sensitivity obtained by the second sensor sensitivity correcting method by the calculated sensitivity error, and the angular velocity may be corrected by multiplying the angular velocity output from the angular velocity detecting sensor by the corrected sensor sensitivity.

The first sensor sensitivity correcting method may correct the sensor sensitivity so that sensor orientation obtained from the angular velocity detecting sensor agrees with GPS orientation obtained from GPS radio waves. When the angular velocity detecting sensor and an acceleration sensor are mounted on the same plane, the second sensor sensitivity correcting method may calculate an oblique angle $\theta_{acc}$ of the acceleration sensor with respect to the horizontal plane using an output signal from the acceleration sensor and a vehicle speed pulse output from a distance sensor, calculate a GPS oblique angle $\theta_{gps}$ that is obtained from GPS radio waves and is an oblique angle of the vehicle with respect to the horizontal plane, calculate an oblique angle $\theta_{sensor}$ of the angular velocity detecting sensor with respect to a travel direction of the vehicle from the oblique angle $\theta_{acc}$ and the GPS oblique angle $\theta_{gps}$, calculate a vehicle oblique angle $\theta_{car}$ that is an oblique angle of the vehicle with respect to the horizontal plane from the oblique angle $\theta_{acc}$ and the oblique angle $\theta_{sensor}$, and output $1/\cos(\theta_{sensor}+\theta_{car})$ as the sensor sensitivity.

Moreover, the first sensor sensitivity correcting method may correct the sensor sensitivity so that sensor orientation obtained from the angular velocity detecting sensor agrees with GPS orientation obtained from GPS radio waves. The second sensor sensitivity correcting method may obtain, as a vehicle oblique angle $\theta_{car}$, a road oblique angle of a position of the vehicle from road oblique angle information included in a map database, and output $1/\cos(\theta_{sensor}+\theta_{car})$ as the sensor sensitivity using the vehicle oblique angle $\theta_{car}$ and an oblique angle $\theta_{sensor}$ of the angular velocity detecting sensor with respect to a travel direction of the vehicle.

Monitoring may be performed to determine whether a condition that reliability of a GPS is high and an oblique angle of the vehicle with respect to the horizontal plane is close to zero degree is satisfied. When the condition is satisfied, the sensitivity error may be calculated.

Angular Velocity Correcting Device

Angular velocity correcting devices that correct sensitivity of an angular velocity detecting sensor that is mounted in a vehicle and detects angular velocity of the vehicle and corrects angular velocity output from the angular velocity detecting sensor using the corrected sensitivity are provided. Some implementations of angular velocity correcting devices include a first sensor sensitivity calculating unit that, considering variation of sensor sensitivity due to an oblique angle of the angular velocity detecting sensor with respect to a horizontal plane and a sensitivity error of the angular velocity detecting sensor, corrects the sensor sensitivity; a second sensor sensitivity calculating unit that, considering the variation of the sensor sensitivity due to the oblique angle of the angular velocity detecting sensor with respect to the horizontal plane without considering the sensitivity error of the angular velocity detecting sensor, corrects the sensor sensitivity; a sensitivity error calculating unit that calculates and outputs, as the sensitivity error of the angular velocity detecting sensor, a ratio of the sensor sensitivity obtained by the first sensor sensitivity calculating unit to the sensor sensitivity obtained by the second sensor sensitivity calculating unit; and an angular velocity correcting unit that corrects the angular velocity output from the angular velocity detecting sensor using the sensitivity error.

Angular velocity correcting devices may further include a sensitivity correcting unit that corrects the sensor sensitivity by multiplying the sensor sensitivity obtained by the second sensor sensitivity calculating unit by the calculated sensitivity error. The angular velocity correcting unit may correct the angular velocity by multiplying the angular velocity output from the angular velocity detecting sensor by the corrected sensor sensitivity.

The first sensor sensitivity calculating unit may include a unit that corrects the sensor sensitivity so that sensor orientation obtained from the angular velocity detecting sensor agrees with GPS orientation obtained from GPS radio waves. The second sensor sensitivity calculating unit may include an oblique angle calculating unit that, when the angular velocity detecting sensor and an acceleration sensor are mounted on the same plane, calculates an oblique angle $\theta_{acc}$ of the acceleration sensor with respect to the horizontal plane using an output signal from the acceleration sensor and a vehicle speed pulse output from a distance sensor, a GPS oblique angle calculating unit that calculates a GPS oblique angle $\theta_{gps}$ that is obtained from GPS radio waves and is an oblique angle of the vehicle with respect to the horizontal plane, a sensor oblique angle calculating unit that calculates an oblique angle $\theta_{sensor}$ of the angular velocity detecting sensor with respect to a travel direction of the vehicle from the oblique angle $\theta_{acc}$ and the GPS oblique angle $\theta_{gps}$, and a vehicle oblique angle calculating unit that calculates a vehicle oblique angle $\theta_{car}$ that is an oblique angle of the vehicle with respect to the horizontal plane from the oblique angle $\theta_{acc}$ and the oblique angle $\theta_{sensor}$. The second sensor sensitivity calculating unit may output $1/\cos(\theta_{sensor}+\theta_{car})$ as the sensor sensitivity.

Moreover, the first sensor sensitivity calculating unit may include a unit that corrects the sensor sensitivity so that sensor orientation obtained from the angular velocity detecting sensor agrees with GPS orientation obtained from GPS radio waves. The second sensor sensitivity calculating unit may include a vehicle oblique angle obtaining unit that obtains, as a vehicle oblique angle $\theta_{car}$, a road oblique angle of a position of the vehicle from road oblique angle information included in a map database. The second sensor sensitivity calculating unit may output $1/\cos(\theta_{sensor}+\theta_{car})$ as the sensor sensitivity using the vehicle oblique angle $\theta_{car}$ and an oblique angle $\theta_{sensor}$ of the angular velocity detecting sensor with respect to a travel direction of the vehicle.

The angular velocity correcting device may further include a GPS reliability determining unit that determines reliability of a GPS, and a monitoring unit that monitors whether an oblique angle of the vehicle with respect to the horizontal plane is close to zero degree. When the reliability of the GPS is high and the oblique angle of the vehicle with respect to the horizontal plane is close to zero degree, the sensitivity error calculating unit may calculate the sensitivity error.

Navigation Device

Navigation devices may include includes a GPS receiver, an angular velocity sensor, an acceleration sensor, and a vehicle speed sensor, the navigation device including a function of detecting a position and orientation of a vehicle using respective output values from the GPS receiver, the angular velocity sensor, the acceleration sensor, and the vehicle speed sensor, is provided. The navigation device includes a vehicle position calculating unit that calculates a position of the vehicle using the angular velocity correcting unit, angular velocity corrected by the angular velocity correcting unit, and the vehicle speed sensor.

Sensitivity correction can be performed, considering the following error factors:

(1) a sensor mounting pitch angle with respect to a vehicle,
(2) a vehicle pitch angle with respect to a horizontal plane (the oblique angle of a road), and
(3) the sensitivity error of the gyroscope (individual difference in characteristics due to, for example, a hardware factor).

Thus, angular velocity can be accurately corrected using the corrected sensitivity.

Moreover, in the present invention, a navigation device that accurately estimates the position of a vehicle using angular velocity that is corrected considering the aforementioned error factors (1) to (3) can be provided.

Moreover, in the present invention, even when GPS radio waves cannot be received or when a vehicle moves in a multistory parking garage where the variation of the vehicle pitch angle is large, gyro angular velocity can be corrected, the accuracy of the position of the vehicle in the multistory parking garage can be kept, and the vehicle can return to an actual driving road immediately after exiting from the multistory parking garage.

Moreover, since the sensitivity error of a gyroscope can be automatically corrected, a step in which the gyroscope is put on, for example, a turntable, and the sensitivity is manually corrected is unnecessary. Thus, the costs may be reduced.

BRIEF DESCRIPTION OF THE DRAWINGS

DESCRIPTION OF THE PREFERRED EMBODIMENTS (A) Overall Configuration of Angular Velocity Correcting Device FIG. 1 shows the overall configuration of one implementation of an angular velocity correcting device. The angular velocity correcting device corrects the sensitivity of an angular velocity detecting sensor (a gyroscope) that is installed in a vehicle and detects the angular velocity of the vehicle. Then, the angular velocity correcting device corrects the angular velocity using the corrected sensitivity.

Figure 1:
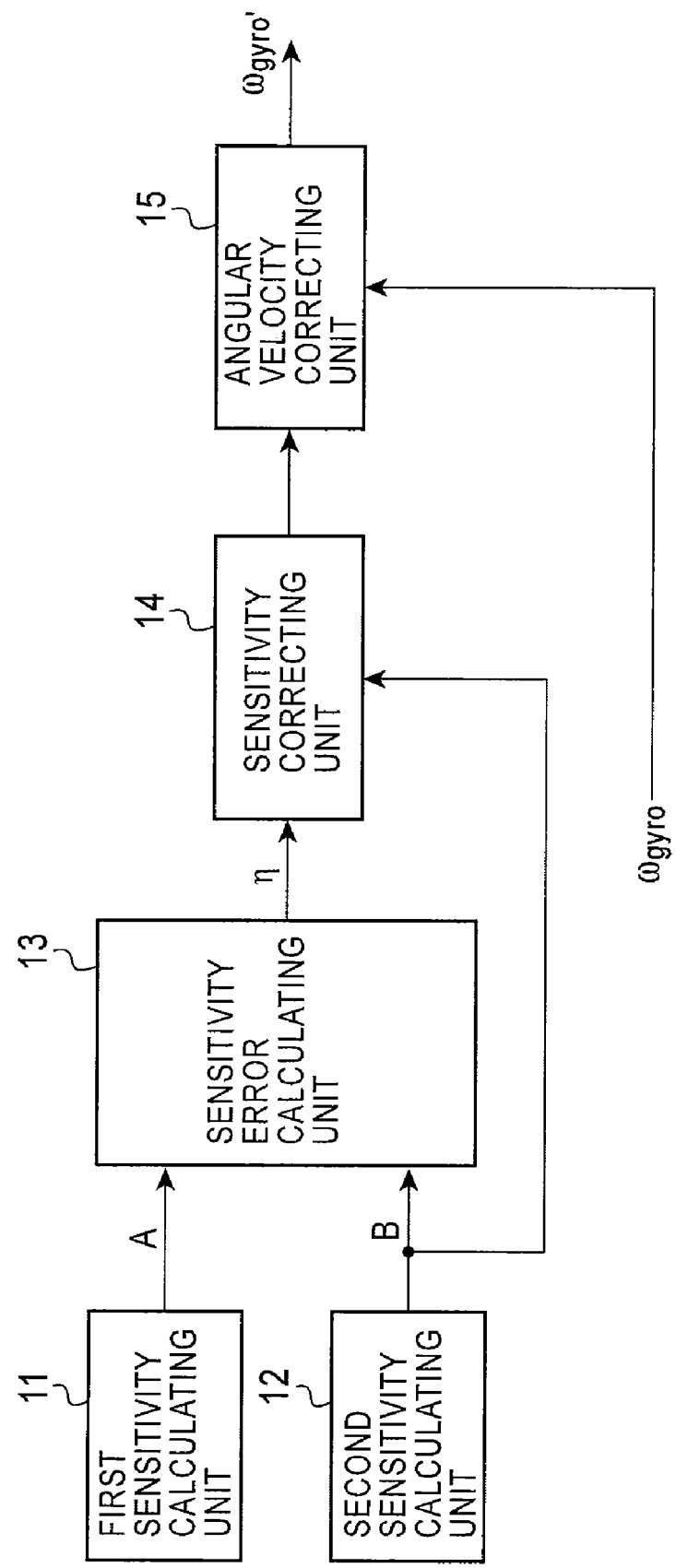
FIG. 1 shows the overall configuration of one implementation of an angular velocity correcting device.

In the angular velocity correcting device, a first sensitivity calculating unit 11 considers both the variation of sensor sensitivity due to the oblique angle of the gyroscope with respect to a horizontal plane (vehicle pitch angle+sensor mounting pitch angle) and the sensitivity error of the gyroscope to correct the sensor sensitivity and output corrected sensitivity A.

A second sensitivity calculating unit 12 does not consider the sensitivity error of the gyroscope but considers only the variation of sensor sensitivity due to the oblique angle of the gyroscope with respect to a horizontal plane to correct the sensor sensitivity and output corrected sensitivity B.

A sensitivity error calculating unit 13 calculates and outputs the ratio η (=A/B) of the sensor sensitivity A obtained by the first sensitivity calculating unit 11 to the sensor sensitivity B obtained by the second sensitivity calculating unit 12 as the sensitivity error of the sensor. The sensor sensitivity A of the angular velocity sensor corrected by the first sensitivity calculating unit 11 depends on the oblique angle of a plane on which the sensor is mounted with respect to a horizontal plane (sensor mounting pitch angle $\theta_{sensor}$+vehicle pitch angle $\theta_{car}$) and the sensitivity error Serror of the gyroscope, and the following relationship equation is formed:

$$A \propto g(\theta_{sensor}+\theta_{car}) \cdot \text{Serror},$$

where g( ) is a function for calculating sensitivity from the oblique angle ($\theta_{sensor}+\theta_{car}$). Moreover, the sensor sensitivity B of the angular velocity sensor corrected by the second sensitivity calculating unit 12 depends only on the oblique angle of the plane, on which the sensor is mounted, with respect to a horizontal plane (sensor mounting pitch angle $\theta_{sensor}$+vehicle pitch angle $\theta_{car}$), and the following relationship equation is formed:

$$B \propto g(\theta_{sensor}+\theta_{car}).$$

Thus, calculation of the ratio η(=/B) of the sensor sensitivity A to the sensor sensitivity B results in:

$$\eta \propto \text{Serror}.$$

Thus, the sensitivity error Serror can be calculated. In this case, when the sensitivity error Serror, the accuracy of which is high, needs to be calculated, the calculation needs to be performed when the reliability of a GPS is high and the vehicle pitch angle (the vehicle oblique angle) is close to 0 deg (=zero degree).

A sensitivity correcting unit 14 multiplies the sensitivity error Serror by the sensor sensitivity B obtained from the second sensitivity calculating unit 12 to correct the sensor sensitivity. Then, an angular velocity correcting unit 15 multiplies angular velocity $\omega_{gyro}$ output from the gyroscope by the corrected sensor sensitivity to correct the angular velocity $\omega_{gyro}$ and output corrected angular velocity $\omega_{gyro}'$.

In this case, when the vehicle pitch angle is large, the error of the sensor sensitivity calculated by the correcting method used by the first sensitivity calculating unit 11 is large. Thus, the sensor sensitivity B obtained from the second sensitivity calculating unit 12 is multiplied by the sensitivity error Serror to correct the sensor sensitivity, and then the angular velocity is corrected using the corrected sensor sensitivity.

(B) First Sensitivity Calculating Unit

Figure 14:
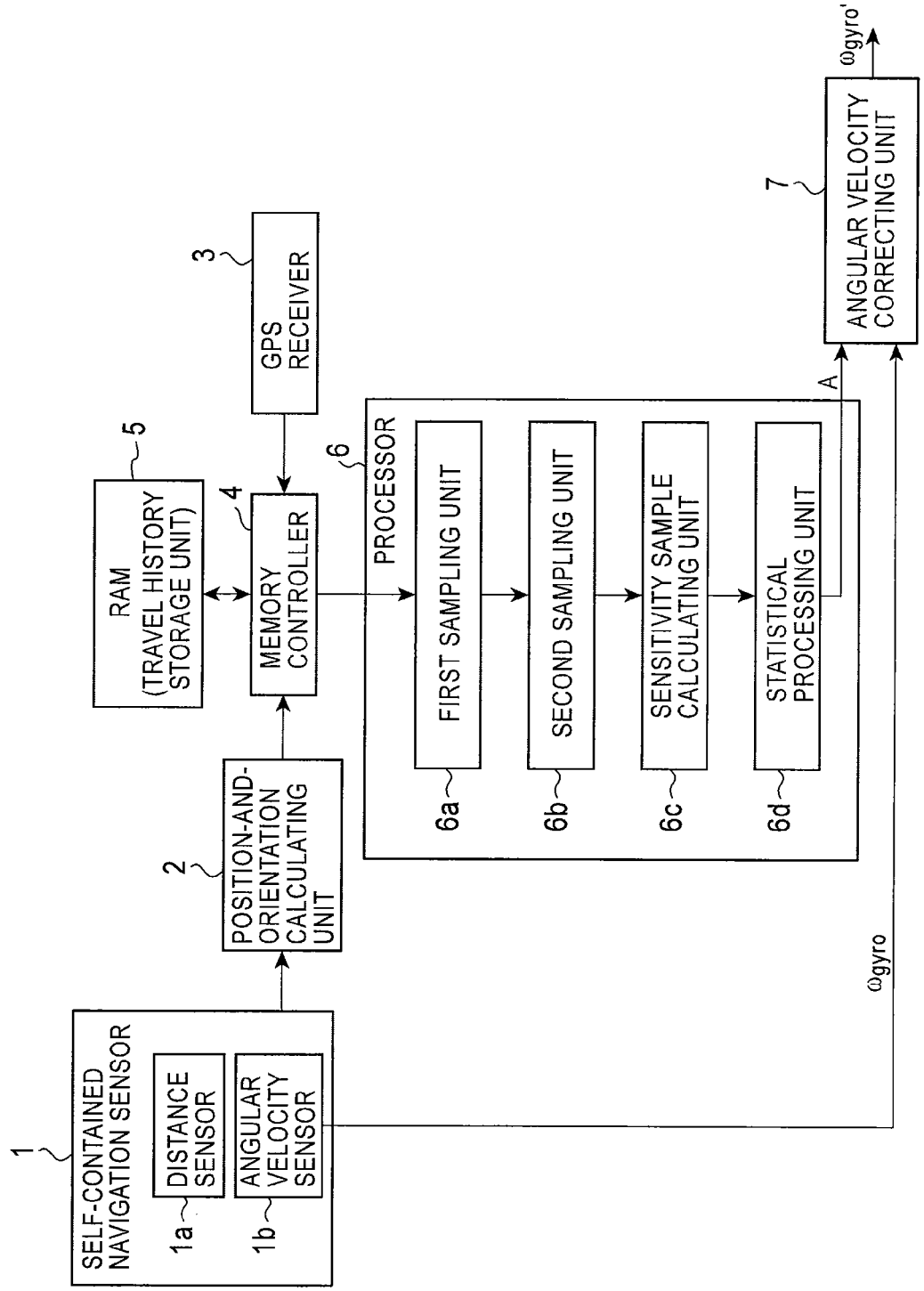
FIG. 14 is a block diagram of an angular velocity correcting device according to a known art.
Figure 15B:
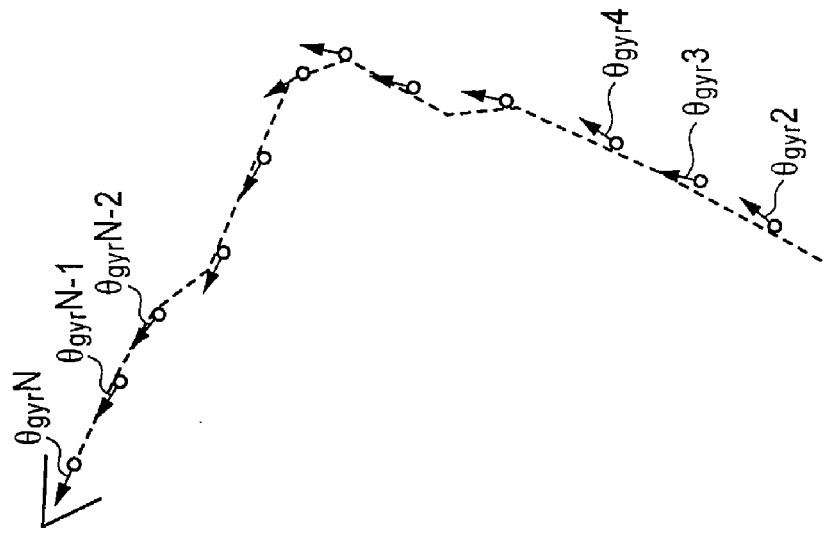
FIGS. 15A and 15B show exemplary travel history data.
Figure 15A:
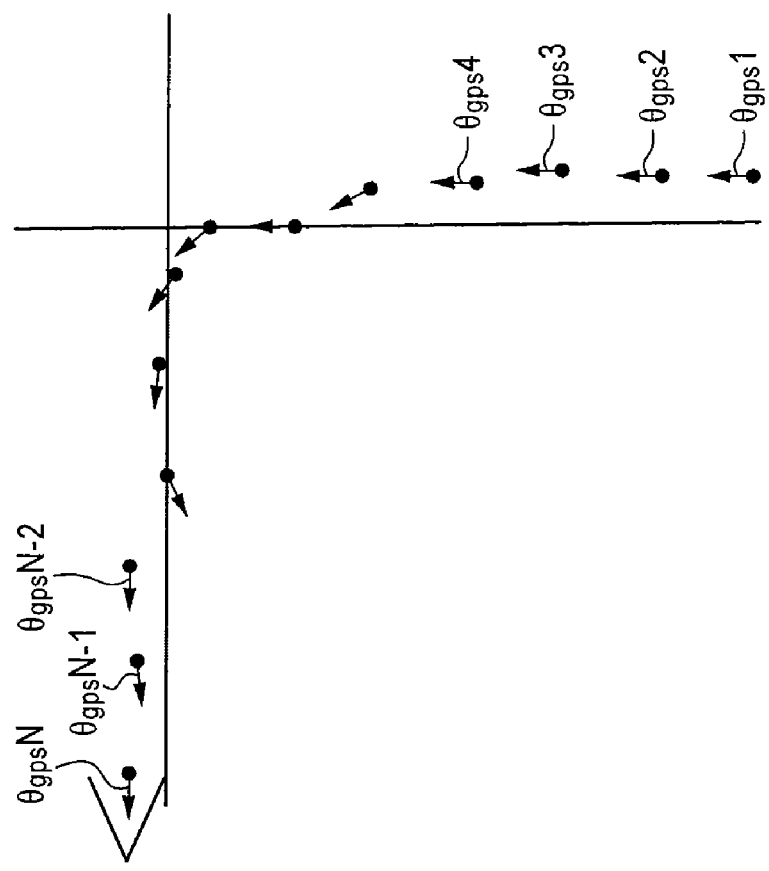

For the first sensitivity calculating unit 11, the same configuration as in the known art shown in FIG. 14 may be adopted. Specifically, the first sensitivity calculating unit 11 includes the self-contained navigation sensor 1, the position-and-orientation calculating unit 2, the GPS receiver 3, the memory controller 4, the RAM 5, and the processor 6. The first sensitivity calculating unit 11 corrects sensor sensitivity so that sensor orientation obtained from an angular velocity detecting sensor agrees with GPS orientation obtained from GPS radio waves to output the corrected sensor sensitivity A.

(C) Second Sensitivity Calculating Unit

Figure 2:
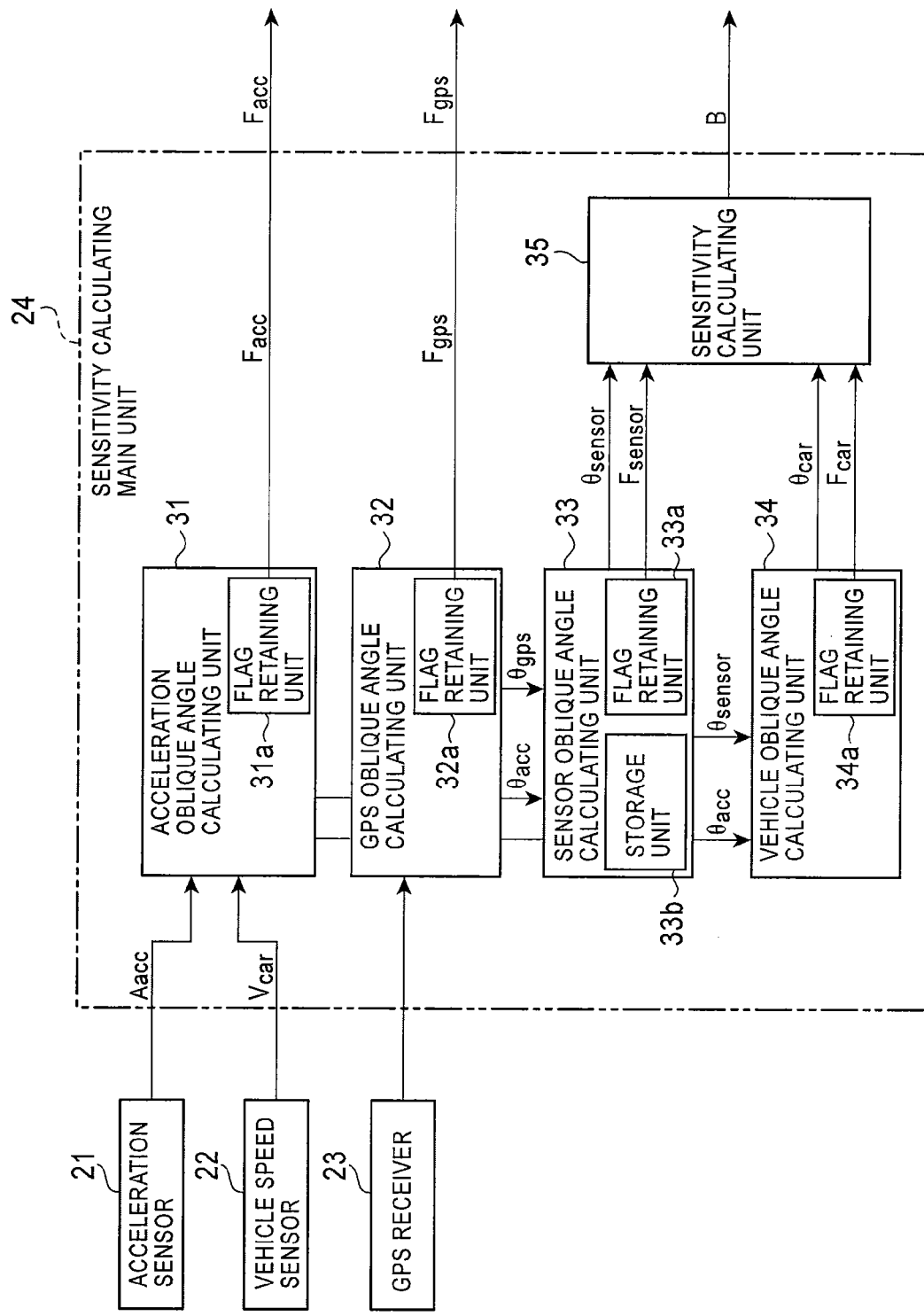
FIG. 2 is a block diagram of a second sensitivity calculating unit.

FIG. 2 is a block diagram of one implementation of the second sensitivity calculating unit 12. The second sensitivity calculating unit 12 includes an acceleration sensor 21, a vehicle speed sensor (distance sensor) 22, a GPS receiver 23, and a sensitivity calculating main unit 24. The sensitivity calculating main unit 24 corrects the sensor sensitivity B of an in-vehicle angular velocity sensor (not shown) using output values from the acceleration sensor 21, the vehicle speed sensor 22, and the GPS receiver 23 to output the corrected sensor sensitivity B. In this case, the acceleration sensor 21 and the angular velocity sensor are integrated and mounted on the same substrate, as shown as GYAC in FIG. 3, and set in a vehicle CAR, the oblique angles of the acceleration sensor 21 and the angular velocity sensor being the same.

(a) Acceleration Oblique Angle Calculating Unit

In the sensitivity calculating main unit 24, an acceleration oblique angle calculating unit 31 calculates the acceleration oblique angle $\theta_{acc}$ of the acceleration sensor 21 (or the angular velocity sensor) with respect to a horizontal plane using an output signal from the acceleration sensor 21 and a vehicle speed pulse output from the vehicle speed sensor 22. The acceleration oblique angle calculating unit 31 further stores an acceleration oblique angle reliability flag $F_{acc}$ that indicates whether the acceleration oblique angle $\theta_{acc}$ is reliable in a flag retaining unit 31a.

Figure 4A:
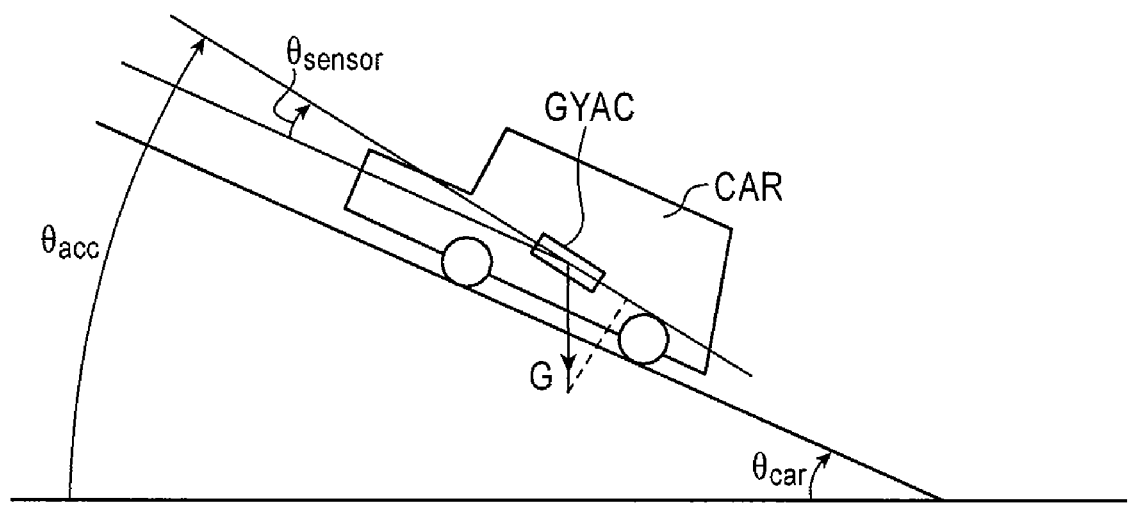
FIGS. 4A and 4B show how to calculate an acceleration oblique angle $\theta_{acc}$.
Figure 4B:
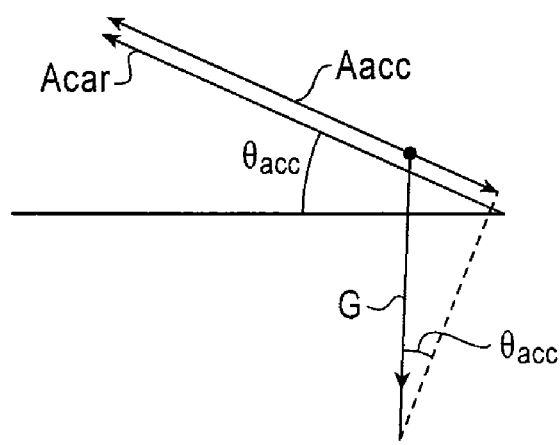

Specifically, the acceleration oblique angle calculating unit 31 calculates the acceleration oblique angle $\theta_{acc}$ indicating the oblique angle of the acceleration sensor 21 with respect to the horizontal direction on the basis of acceleration $A_{acc}$ output from the acceleration sensor 21, acceleration $A_{car}$ obtained from a change in vehicle speed $V_{car}$ output from the vehicle speed sensor 22 per unit time, and gravitational acceleration G. The acceleration $A_{acc}$ output from the acceleration sensor 21 is affected by as much influence of the gravitational acceleration G as the inclination of the acceleration sensor 21 with respect to the horizontal direction, and thus the acceleration $A_{acc}$ is smaller than the acceleration $A_{car}$ obtained from a change in vehicle speed by the sine component G·sin($\theta_{acc}$) of the gravitational acceleration G, as shown in FIGS. 4A and 4B. That is, the following relationship is formed:

$$G \cdot \sin(\theta_{acc}) = A_{car} - A_{acc}.$$

Figure 3:
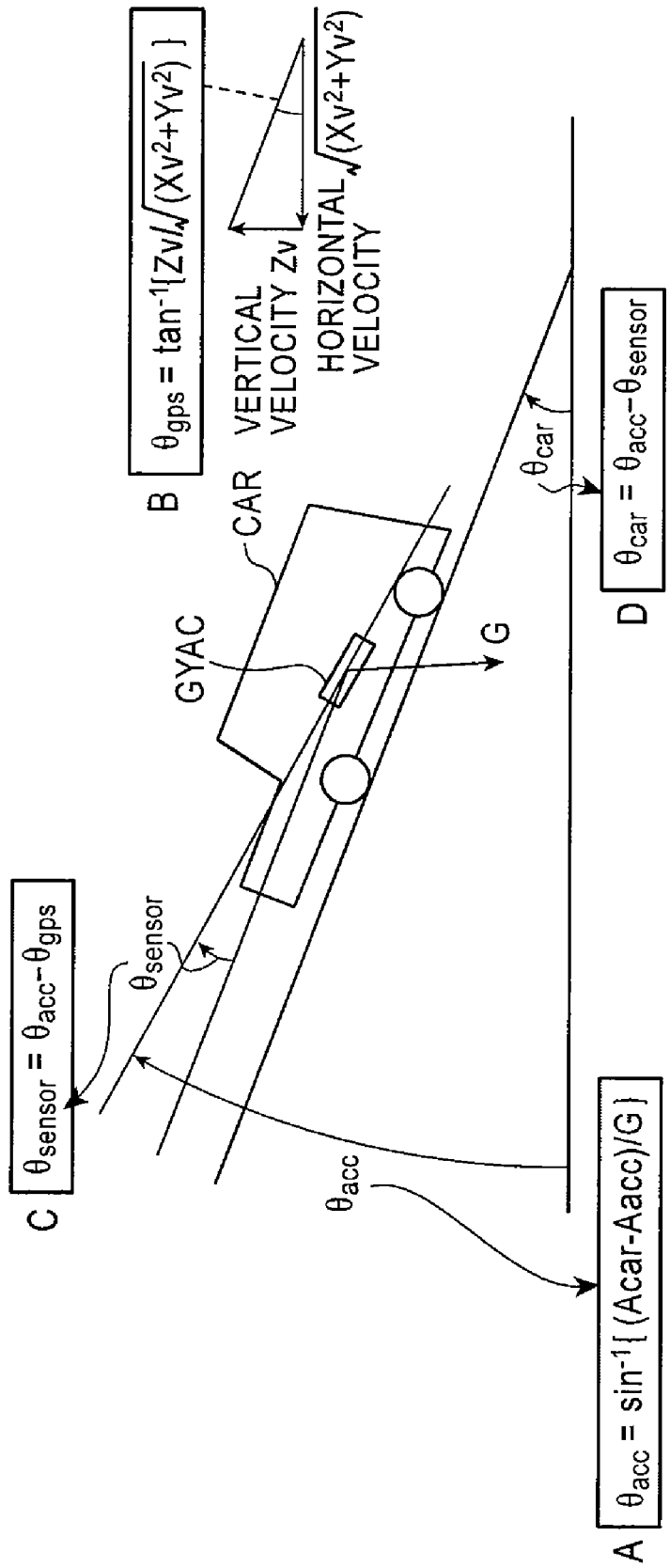
FIG. 3 shows a state of inclination of a vehicle and equations for calculating individual oblique angles.

Thus, the acceleration oblique angle $\theta_{acc}$ can be obtained by the following calculation, as shown in Part A of FIG. 3:

$$\theta_{acc} = \sin^{-1}[(A_{car} - A_{acc})/G]. \quad (4)$$

Moreover, the acceleration oblique angle calculating unit 31 determines the reliability of the acceleration oblique angle $\theta_{acc}$ on the basis of the vehicle speed $V_{car}$ output from the vehicle speed sensor 22. When the vehicle speed $V_{car}$ is low, a vehicle is likely to be subjected to vibrations from a road surface, so that the reliability of the calculated acceleration oblique angle $\theta_{acc}$ decreases. Thus, for example, the acceleration oblique angle calculating unit 31 determines whether the vehicle speed $V_{car}$ is equal to or more than 10 km/h. When the vehicle speed $V_{car}$ is equal to or more than 10 km/h, the acceleration oblique angle calculating unit 31 determines that the acceleration oblique angle $\theta_{acc}$ is reliable and turns on the acceleration oblique angle reliability flag $F_{acc}$. When the vehicle speed $V_{car}$ is less than 10 km/h, the acceleration oblique angle calculating unit 31 determines that the acceleration oblique angle $\theta_{acc}$ is not reliable and turns off the acceleration oblique angle reliability flag $F_{acc}$. The acceleration oblique angle calculating unit 31 calculates and outputs the acceleration oblique angle $\theta_{acc}$ only when the acceleration oblique angle reliability flag $F_{acc}$ is on.

Figure 5:
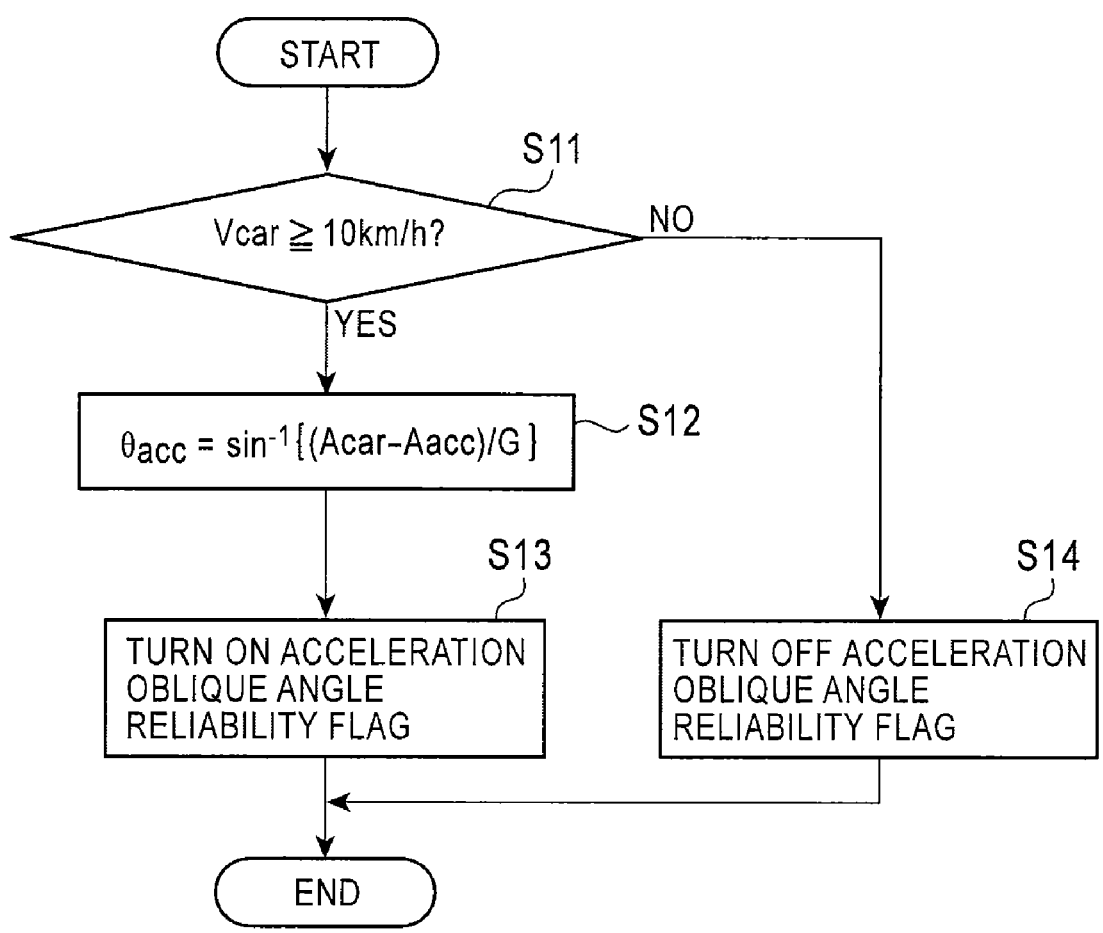
FIG. 5 shows a process flow of calculation of an acceleration oblique angle.

FIG. 5 shows a process flow of calculation of an acceleration oblique angle by the acceleration oblique angle calculating unit 31. In steps S11 to S14, the acceleration oblique angle $\theta_{acc}$ is calculated and output.

(b) GPS Oblique Angle Calculating Unit

A GPS oblique angle calculating unit 32 calculates GPS oblique angle $\theta_{gps}$ that indicates the oblique angle of a vehicle with respect to a horizontal plane on the basis of a change in the frequency due to the Doppler effect of radio waves received by the GPS receiver 23 from a plurality of GPS satellites (not shown). Specifically, the GPS oblique angle calculating unit 32 determines whether three-dimensional positioning can be performed. When three-dimensional positioning can be performed, three-dimensional positioning is performed in the latitude direction (the X axis direction), the longitudinal direction (the Y axis direction), and the height direction (the Z axis direction) to obtain the GPS oblique angle $\theta_{gps}$ on the basis of velocity components Xv, Yv, and Zv in the respective directions according to the following equation, as shown in Part B of FIG. 3:

$$\theta_{gps} = \tan^{-1}[Zv/\sqrt{(Xv^2 + Yv^2)}]. \quad (5)$$

Moreover, the GPS oblique angle calculating unit 32 determines the reliability of the GPS oblique angle $\theta_{gps}$. When the GPS oblique angle calculating unit 32 determines that the GPS oblique angle $\theta_{gps}$ is reliable, the GPS oblique angle calculating unit 32 turns on a GPS oblique angle reliability flag $F_{gps}$ and stores the GPS oblique angle reliability flag $F_{gps}$ in a flag retaining unit 32a. When the GPS oblique angle calculating unit 32 determines that the GPS oblique angle $\theta_{gps}$ is not reliable, the GPS oblique angle calculating unit 32 turns off the GPS oblique angle reliability flag $F_{gps}$ and stores the GPS oblique angle reliability flag $F_{gps}$ in the flag retaining unit 32a. The determination of the reliability of the GPS oblique angle $\theta_{gps}$ is performed in the following manner.

When vehicle speed is low, the accuracy of the calculated GPS oblique angle $\theta_{gps}$ is not improved. Moreover, when the GPS oblique angle $\theta_{gps}$ is obtained, the vertical velocity Zv needs to be divided by the horizontal velocity $\sqrt{(Xv^2+Yv^2)}$, as is apparent from the computing equation for obtaining the GPS oblique angle $\theta_{gps}$. Thus, when a vehicle stops, so that the vehicle speed is zero, the GPS oblique angle $\theta_{gps}$ cannot be obtained. Thus, for example, the GPS oblique angle calculating unit 32 determines whether GPS speed $V_{gps}$ is equal to or more than 10 km/h. When the GPS speed $V_{gps}$ is equal to or more than 10 km/h, it is determined that the GPS oblique angle $\theta_{gps}$ is reliable. When the GPS speed $V_{gps}$ is less than 10 km/h, it is determined that the GPS oblique angle $\theta_{gps}$ is not reliable.

Moreover, the GPS oblique angle calculating unit 32 obtains the actually calculated GPS oblique angle $\theta_{gps}$ and determines the reliability of the GPS oblique angle $\theta_{gps}$ on the basis of whether the absolute value of the GPS oblique angle $\theta_{gps}$ is equal to or less than a predetermined value. In Japan, there is no road the oblique angle of which exceeds ten degrees. Thus, for example, the GPS oblique angle calculating unit 32 determines whether the GPS oblique angle $\theta_{gps}$ is equal to or less than ten degrees. When the GPS oblique angle $\theta_{gps}$ is equal to or less than ten degrees, it is determined that the GPS oblique angle $\theta_{gps}$ is reliable. When the GPS oblique angle $\theta_{gps}$ exceeds ten degrees, it is determined that the GPS oblique angle $\theta_{gps}$ is not reliable.

Moreover, the GPS oblique angle calculating unit 32 obtains the actually calculated GPS oblique angle $\theta_{gps}$ and determines the reliability of the GPS oblique angle $\theta_{gps}$ on the basis of whether the standard deviation of the GPS oblique angle $\theta_{gps}$ is equal to or less than a predetermined value. For example, when the standard deviation of the GPS oblique angle $\theta_{gps}$ is equal to or less than three degrees, it can be determined that the variation of the value of the calculated GPS oblique angle $\theta_{gps}$ is small, and thus it is determined that the GPS oblique angle $\theta_{gps}$ is reliable. On the other hand, when the standard deviation of the GPS oblique angle $\theta_{gps}$ exceeds three degrees, it is determined that the GPS oblique angle $\theta_{gps}$ is not reliable. When any one of the aforementioned conditions is not satisfied, the GPS oblique angle calculating unit 32 determines that the GPS oblique angle $\theta_{gps}$ is not reliable.

The GPS oblique angle calculating unit 32 turns on the GPS oblique angle reliability flag $F_{gps}$ upon determining that the GPS oblique angle $\theta_{gps}$ is reliable. The GPS oblique angle calculating unit 32 turns off the GPS oblique angle reliability flag $F_{gps}$ upon determining that the GPS oblique angle $\theta_{gps}$ is not reliable.

Figure 6:
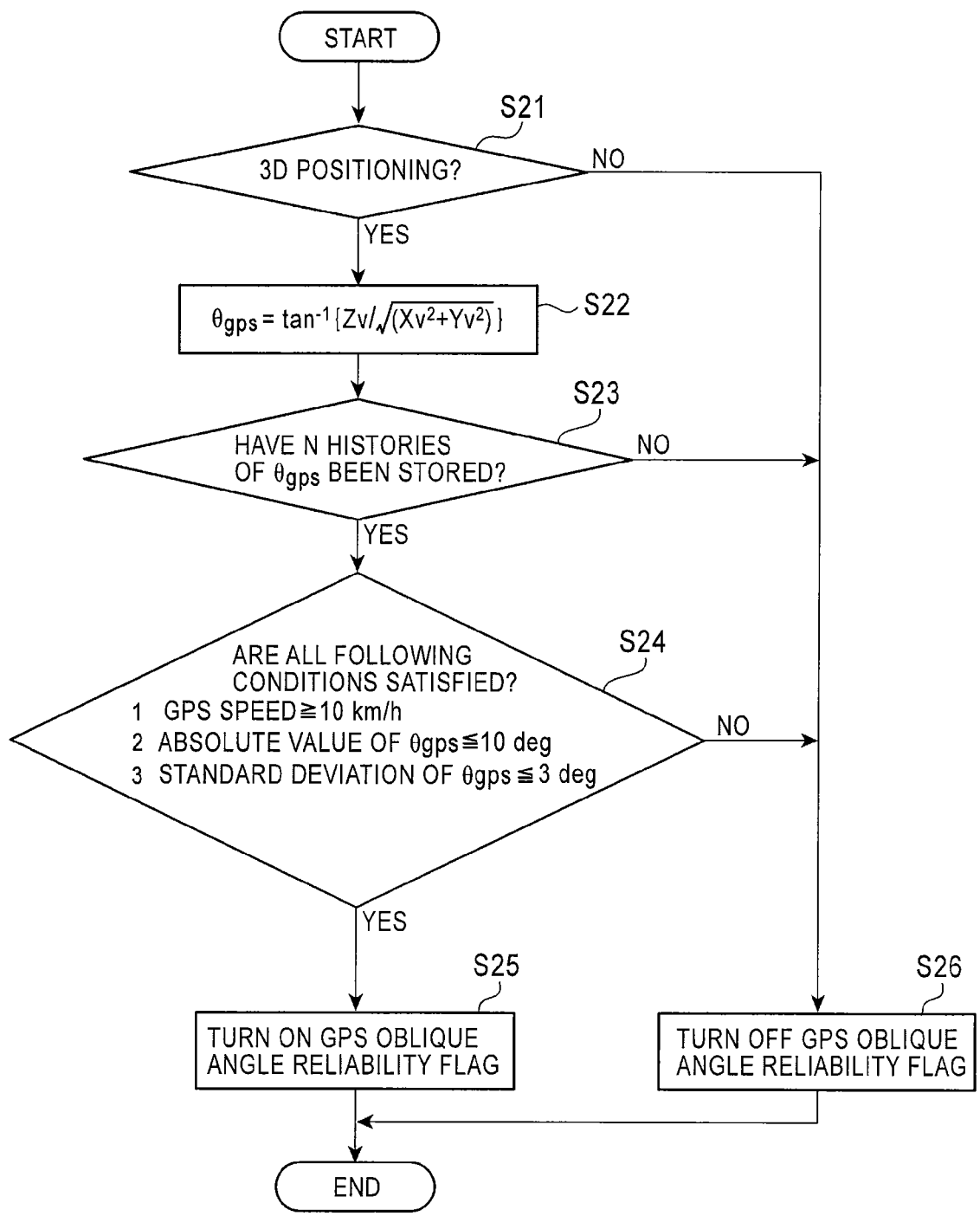
FIG. 6 shows a process flow of calculation of a GPS oblique angle.

FIG. 6 shows a process flow of calculation of a GPS oblique angle by the GPS oblique angle calculating unit 32. In steps S21 to S26, the GPS oblique angle $\theta_{gps}$ is calculated, and the reliability of the GPS oblique angle $\theta_{gps}$ is determined.

(c) Sensor Oblique Angle Calculating Unit

When both the acceleration oblique angle reliability flag $F_{acc}$ and the GPS oblique angle reliability flag $F_{gps}$ are on, i.e., when both the acceleration oblique angle $\theta_{acc}$ and the GPS oblique angle $\theta_{gps}$ are reliable, a sensor oblique angle calculating unit 33 calculates sensor oblique angle $\theta_{sensor}$ that indicates the oblique angle of the angular velocity sensor with respect to the travel direction of a vehicle on the basis of the acceleration oblique angle $\theta_{acc}$ and the GPS oblique angle $\theta_{gps}$. Specifically, the sensor oblique angle calculating unit 33 calculates the sensor oblique angle $\theta_{sensor}$ according to the following equation, as shown in Part C of FIG. 3:

$$\theta_{sensor}=\theta_{acc}-\theta_{gps}. \qquad (6)$$

Then, the sensor oblique angle calculating unit 33 stores the sensor oblique angle $\theta_{sensor}$ in a storage unit 33b and outputs the sensor oblique angle $\theta_{sensor}$ to a vehicle oblique angle calculating unit 34.

Moreover, when at least one of the acceleration oblique angle $\theta_{acc}$ and the GPS oblique angle $\theta_{gps}$ is not reliable, the sensor oblique angle calculating unit 33 determines whether any past calculated value of the sensor oblique angle $\theta_{sensor}$ is stored in the storage unit 33b. When any past calculated value of the sensor oblique angle $\theta_{sensor}$ is stored in the storage unit 33b, the sensor oblique angle calculating unit 33 reads the sensor oblique angle $\theta_{sensor}$ stored in the storage unit 33b and outputs the sensor oblique angle $\theta_{sensor}$ to the vehicle oblique angle calculating unit 34.

Moreover, when the sensor oblique angle calculating unit 33 outputs the sensor oblique angle $\theta_{sensor}$, the sensor oblique angle calculating unit 33 determines that the sensor oblique angle $\theta_{sensor}$ is reliable to turn on a sensor oblique angle reliability flag $F_{sensor}$ and store the sensor oblique angle reliability flag $F_{sensor}$ in a flag retaining unit 33a. When the sensor oblique angle calculating unit 33 does not output the sensor oblique angle $\theta_{sensor}$, the sensor oblique angle calculating unit 33 determines that the sensor oblique angle $\theta_{sensor}$ is not reliable to turn off the sensor oblique angle reliability flag $F_{sensor}$ and store the sensor oblique angle reliability flag $F_{sensor}$ in the flag retaining unit 33a.

Figure 7:
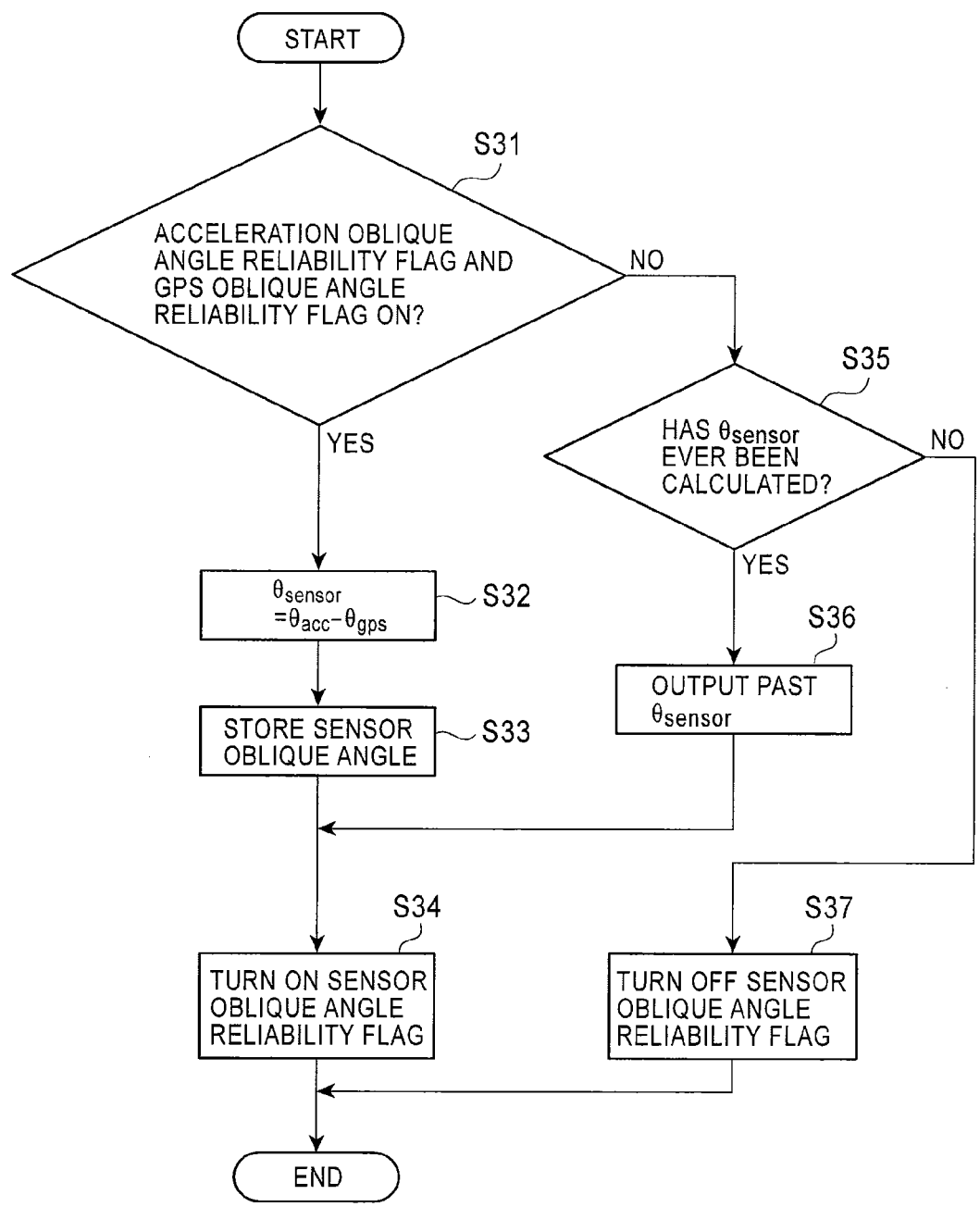
FIG. 7 shows a process flow of calculation of a sensor oblique angle.

FIG. 7 shows a process flow of calculation of a sensor oblique angle by the sensor oblique angle calculating unit 33. In steps S31 to S37, the sensor oblique angle $\theta_{sensor}$ is calculated, and the reliability of the sensor oblique angle $\theta_{sensor}$ is determined.

(d) Vehicle Oblique Angle Calculating Unit

When both the acceleration oblique angle reliability flag $F_{acc}$ and the sensor oblique angle reliability flag $F_{sensor}$ are on, i.e., when both the acceleration oblique angle $\theta_{acc}$ and the sensor oblique angle $\theta_{sensor}$ are reliable, a vehicle oblique angle calculating unit 34 calculates the oblique angle (vehicle oblique angle) $\theta_{car}$ of a vehicle with respect to a horizontal plane on the basis of the acceleration oblique angle $\theta_{acc}$ and the sensor oblique angle $\theta_{sensor}$. Specifically, the vehicle oblique angle calculating unit 34 calculates and outputs the vehicle oblique angle $\theta_{car}$ according to the following equation, as shown in Part D of FIG. 3:

$$\theta_{car}=\theta_{acc}-\theta_{sensor}. \qquad (7)$$

When at least one of the acceleration oblique angle $\theta_{acc}$ and the sensor oblique angle $\theta_{sensor}$ is not reliable, the vehicle oblique angle calculating unit 34 does not calculate the vehicle oblique angle $\theta_{car}$. Moreover, the vehicle oblique angle calculating unit 34 determines the reliability of the vehicle oblique angle $\theta_{car}$ on the basis of whether the vehicle oblique angle $\theta_{car}$ has been calculated. That is, when the vehicle oblique angle calculating unit 34 calculates and outputs the vehicle oblique angle $\theta_{car}$, the vehicle oblique angle calculating unit 34 determines that the vehicle oblique angle $\theta_{car}$ is reliable to turn on a vehicle oblique angle reliability flag $F_{car}$ and store the vehicle oblique angle reliability flag $F_{car}$ in a flag retaining unit 34a. When the vehicle oblique angle calculating unit 34 does not output the vehicle oblique angle $\theta_{car}$, the vehicle oblique angle calculating unit 34 determines that the vehicle oblique angle $\theta_{car}$ is not reliable to turn off the vehicle oblique angle reliability flag $F_{car}$ and store the vehicle oblique angle reliability flag $F_{car}$ in the flag retaining unit 34a.

Figure 8:
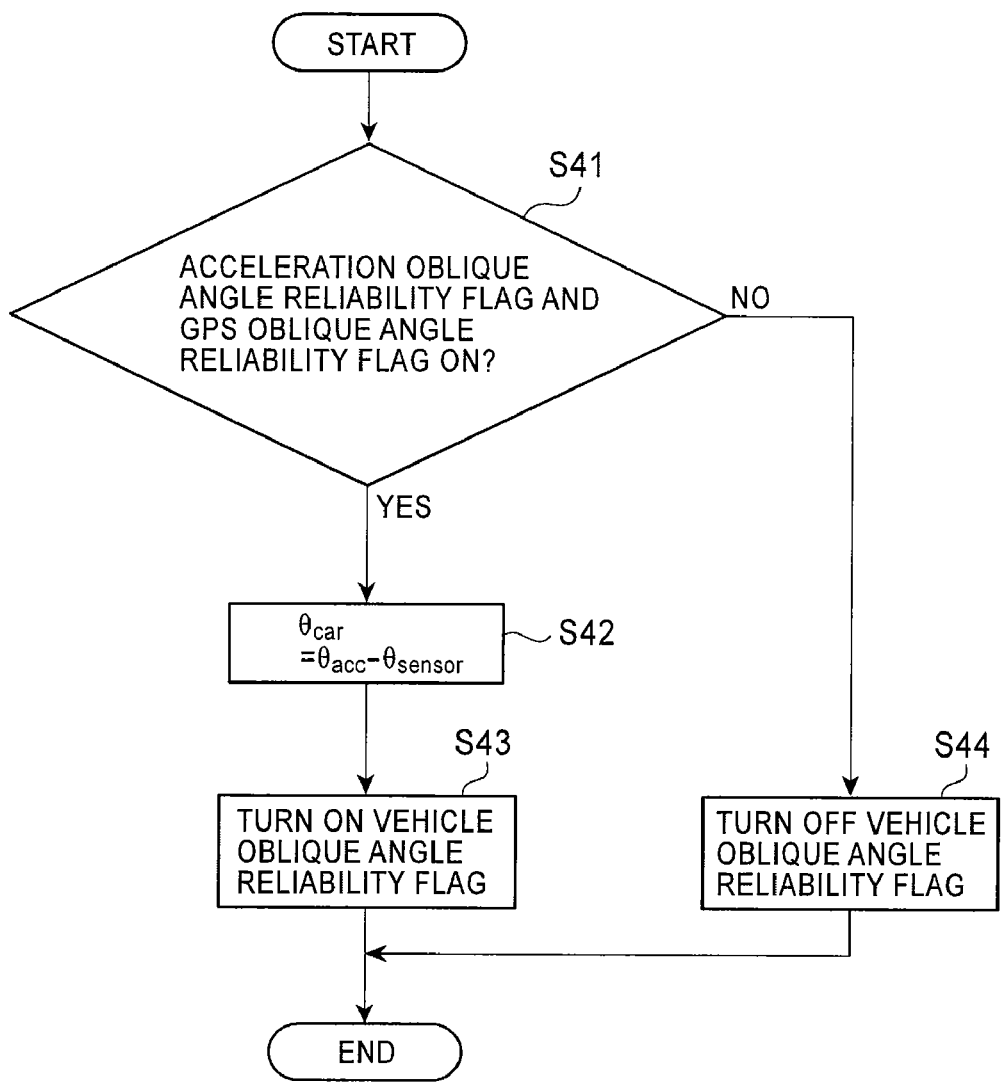
FIG. 8 shows a process flow of calculation of a vehicle oblique angle.

FIG. 8 shows a process flow of calculation of a vehicle oblique angle by the vehicle oblique angle calculating unit 34. In steps S41 to S44, the vehicle oblique angle $\theta_{car}$ is calculated, and the reliability of the vehicle oblique angle $\theta_{car}$ is determined.

(e) Sensitivity Calculating Unit

A sensitivity calculating unit 35 calculates and outputs the sensor sensitivity B using the sensor oblique angle $\theta_{sensor}$ and the vehicle oblique angle $\theta_{car}$, which is the oblique angle of a vehicle with respect to a horizontal plane, according to the following equation:

$$B=1/\cos(\theta_{sensor}+\theta_{car}). \qquad (8)$$

Figure 9:
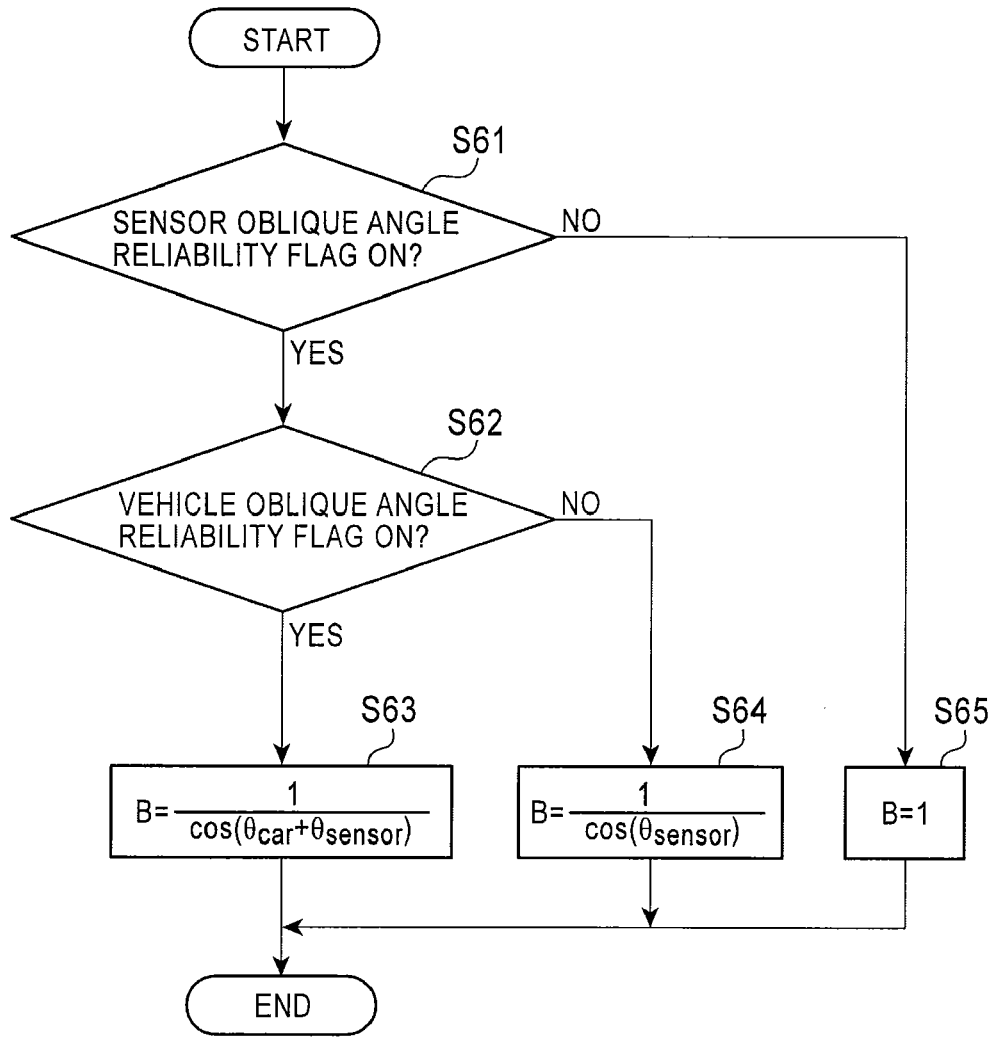
FIG. 9 shows a process flow of sensitivity correction.

FIG. 9 shows the process flow of calculation of sensitivity by the sensitivity calculating unit 35. When the sensitivity calculating unit 35 determines in steps S61 and S62 that the sensor oblique angle $\theta_{sensor}$ is reliable (the sensor oblique angle reliability flag $F_{sensor}$ is on) and the vehicle oblique angle $\theta_{car}$ is reliable (the vehicle oblique angle reliability flag $F_{car}$ is on), in step S63, the sensitivity calculating unit 35 calculates and outputs the sensor sensitivity B according to equation (8). On the other hand, when the sensor oblique angle $\theta_{sensor}$ is reliable but the vehicle oblique angle $\theta_{car}$ is not reliable, in step S64, the sensitivity calculating unit 35 calculates and outputs the sensor sensitivity B on the basis of the sensor oblique angle $\theta_{sensor}$ according to the following equation:

$$B=1/\cos(\theta_{sensor}). \qquad (8)'$$

When neither the sensor oblique angle $\theta_{sensor}$ nor the vehicle oblique angle $\theta_{car}$ are reliable, in step S65, angular velocity is not corrected, i.e., B=1.

Thus, the second sensitivity calculating unit 12 can correct the sensitivity of the angular velocity sensor due to a vehicle oblique angle (a vehicle pitch angle) and a sensor oblique angle (a sensor mounting pitch angle) according to equation (8). Moreover, even when a vehicle oblique angle (a vehicle pitch angle) is not reliable, the second sensitivity calculating unit 12 can correct the sensitivity of the angular velocity sensor according to equation (8)'. However, the second sensitivity calculating unit 12 cannot correct the sensitivity of the angular velocity sensor due to the sensitivity error of the angular velocity sensor.

(D) Detailed Configuration of Angular Velocity Correcting Device

Figure 10:
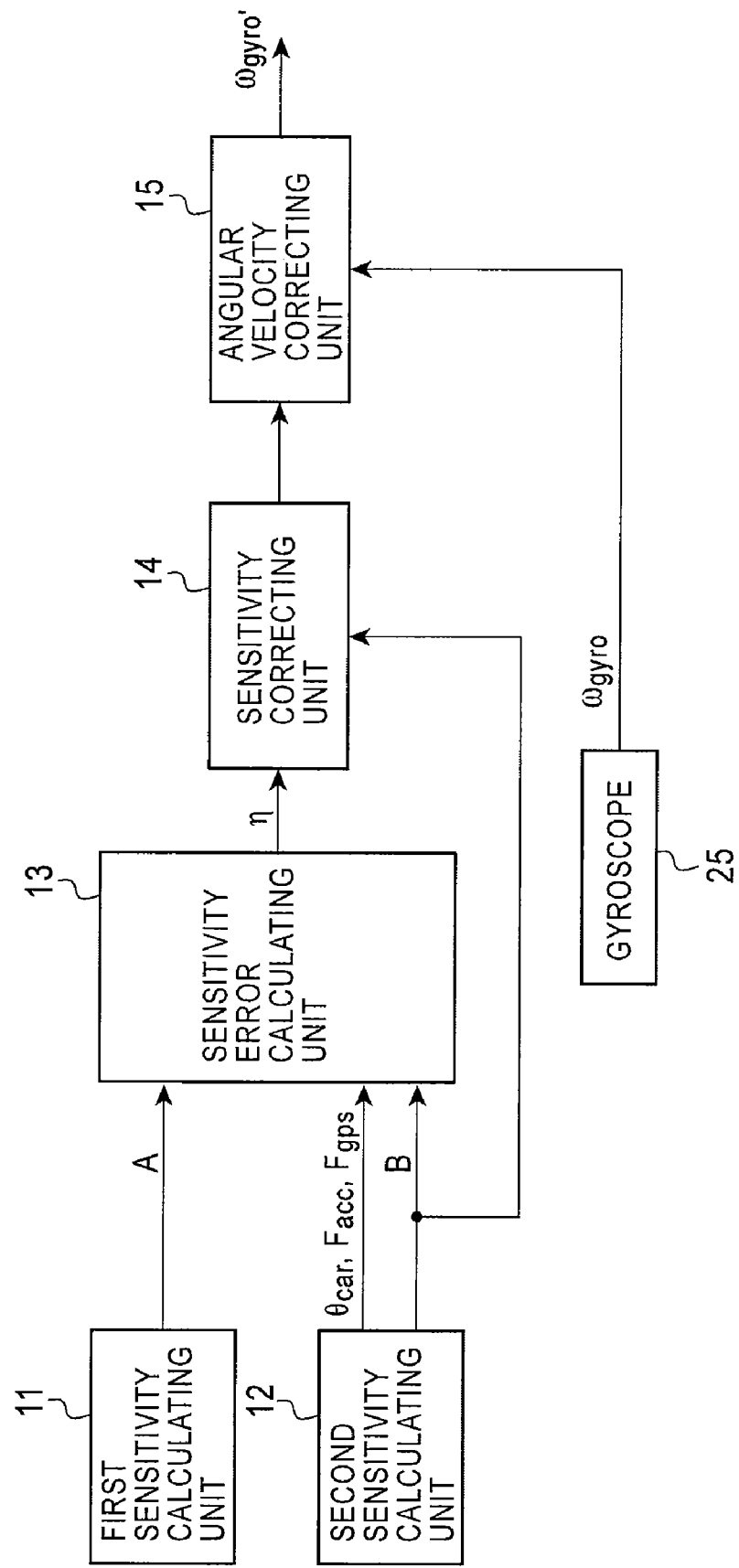
FIG. 10 is a detailed block diagram of one implementation of an angular velocity correcting device.

FIG. 10 is a detailed block diagram of an angular velocity correcting device. In FIG. 10, the same reference numerals as in FIG. 1 are assigned to corresponding components. FIG. 10 is different from FIG. 1 in that (1) an acceleration sensor (gyroscope) 25 that detects the acceleration $\omega_{gyro}$ of a vehicle and inputs the acceleration $\omega_{gyro}$ to the angular velocity correcting unit 15 is provided; (2) the second sensitivity calculating unit 12 inputs, to the sensitivity error calculating unit 13, in addition to the sensitivity B, the vehicle oblique angle (vehicle pitch angle) $\theta_{car}$, the acceleration oblique angle reliability flag $F_{acc}$, and the GPS oblique angle reliability flag $F_{gps}$; and (3) the second sensitivity calculating unit 12 inputs the sensitivity B to the sensitivity correcting unit 14.

Figure 11:
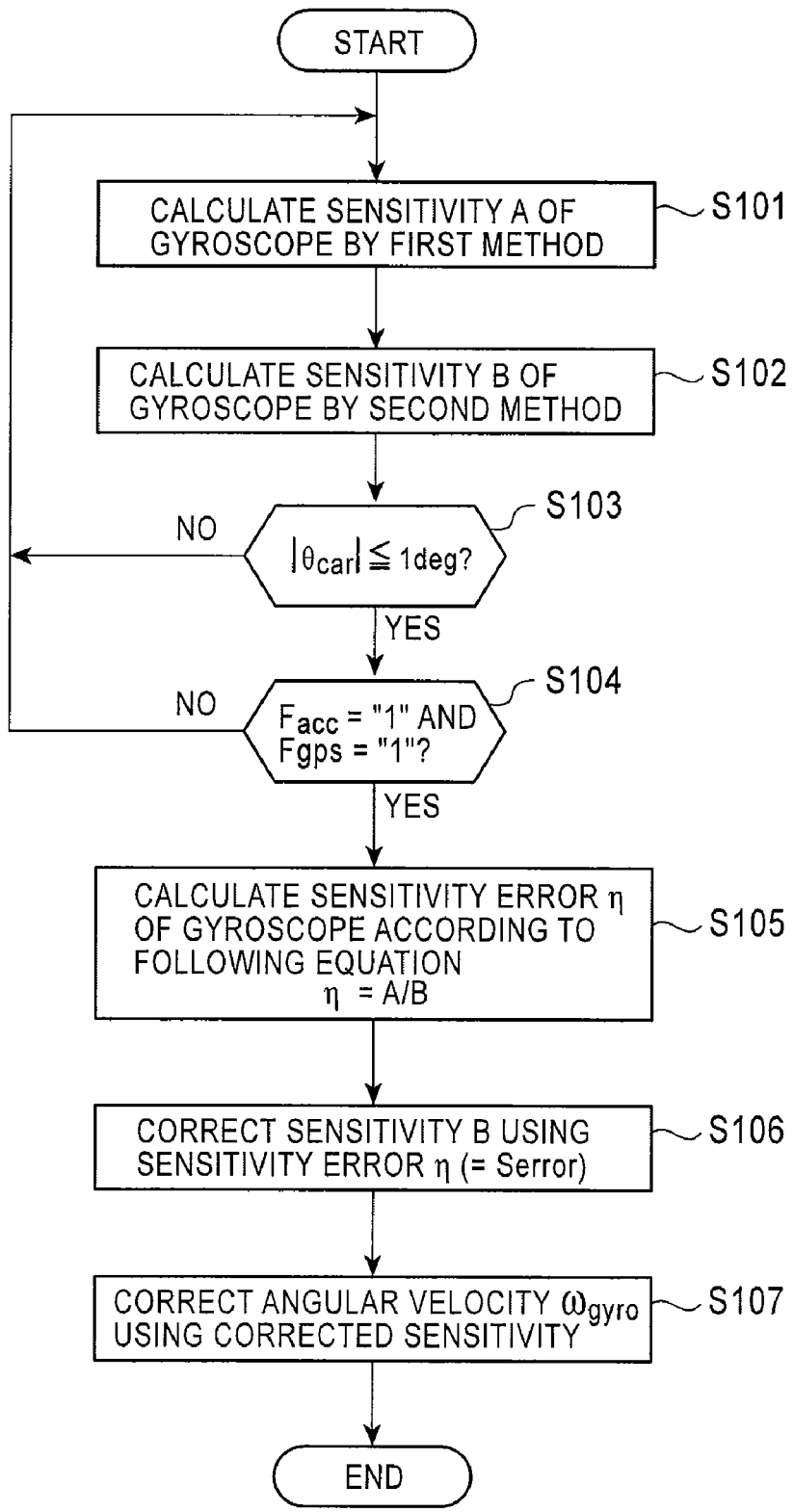
FIG. 11 shows a process flow of angular velocity correction by an angular velocity correcting device.

FIG. 11 shows the process flow of correction of an angular velocity by the angular velocity correcting device shown in FIG. 10.

In step S101, the first sensitivity calculating unit 11 calculates the sensitivity A of the gyroscope 25 by a first method and inputs the sensitivity A to the sensitivity error calculating unit 13. The sensitivity A of the gyroscope 25 depends on the oblique angle of a plane on which the sensor is mounted with respect to a horizontal plane (sensor mounting pitch angle $\theta_{sensor}$+vehicle pitch angle $\theta_{car}$) and the sensitivity error Serror of the gyroscope 25, and the following relationship equation is formed:

$$A \propto g(\theta_{sensor}+\theta_{car}) \cdot Serror. \quad (9)$$

Moreover, in step S102, the second sensitivity calculating unit 12 calculates the sensitivity B of the gyroscope 25 by a second method to input the sensitivity B to the sensitivity error calculating unit 13. The second sensitivity calculating unit 12 further inputs the vehicle oblique angle (vehicle pitch angle) $\theta_{car}$, the acceleration oblique angle reliability flag $F_{acc}$, and the GPS oblique angle reliability flag $F_{gps}$ to the sensitivity error calculating unit 13. The sensor sensitivity B depends only on the oblique angle of the plane, on which the sensor is mounted, with respect to a horizontal plane (sensor mounting pitch angle $\theta_{sensor}$+vehicle pitch angle $\theta_{car}$), and the following relationship equation is formed:

$$B \propto g(\theta_{sensor}+\theta_{car}). \quad (10)$$

In step S103, the sensitivity error calculating unit 13 determines whether the absolute value of the vehicle oblique angle (vehicle pitch angle) $\theta_{car}$ is less than or equal to 1 deg (one degree). When the vehicle oblique angle (vehicle pitch angle) $\theta_{car}$ exceeds 1 deg, the process returns to step S101 without a sensitivity error being calculated. This is because, when the vehicle pitch angle $\theta_{car}$ is less than or equal to zero degree, the vehicle pitch angle can be excluded from error factors of the gyroscope 25. For example, when the vehicle pitch angle $\theta_{car}$ is equal to zero degree, $\theta_{car}$ in equations (9) and (10) can be disregarded, so that, in the first and second methods, a calculation error due to difference in the vehicle pitch angle can be eliminated.

When the absolute value of the vehicle oblique angle (vehicle pitch angle) $\theta_{car}$ is less than or equal to 1 deg, in step S104, the sensitivity error calculating unit 13 determines whether both the acceleration oblique angle reliability flag $F_{acc}$ and the GPS oblique angle reliability flag $F_{gps}$ are on. When either the acceleration oblique angle reliability flag $F_{acc}$ or the GPS oblique angle reliability flag $F_{gps}$ is off, the sensitivity error calculating unit 13 determines that the sensor sensitivities A and B are not reliable, and then the process returns to step S101 without a sensitivity error being calculated.

On the other hand, when both the acceleration oblique angle reliability flag $F_{acc}$ and the GPS oblique angle reliability flag $F_{gps}$ are on, the sensitivity error calculating unit 13 determines that the sensitivities A and B are reliable and then, in step S105, calculates the ratio $\eta(=A/B)$ of the sensor sensitivity A to the sensor sensitivity B and inputs T to the sensitivity correcting unit 14 as a sensitivity error. The ratio $\eta$ corresponds to the sensitivity error Serror, as is apparent from equations (9) and (10). Thus, the sensitivity error Serror can be calculated by performing adjustment so that the sensitivity correction value $\eta$ is equal to one when the sensitivity agrees with a standard value of 25 mv/(deg/s).

When the sensitivity error Ti has been input, in step S106, the sensitivity correcting unit 14 multiplies, by the sensitivity error Serror, the sensor sensitivity B obtained by the second sensitivity calculating unit 12 to correct the sensor sensitivity. In this case, the sensor sensitivity B is obtained according to equations (8) and (8)'. Specifically, the sensitivity correcting unit 14 corrects the sensitivity of the gyroscope 25 according to the following equation:

$$\text{Sensor Sensitivity}=\{1/(\theta_{sensor}+\theta_{car})\} \times Serror. \quad (11)$$

Then, in step S107, the angular velocity correcting unit 15 corrects the angular velocity $\omega_{gyro}$ input from the gyroscope 25 according to the following equation:

$$\omega_{gyro}'=\omega_{gyro} \times \{1/(\theta_{sensor}+\theta_{car})\} \times Serror. \quad (12)$$

Then, the angular velocity correcting unit 15 outputs the corrected angular velocity $\omega_{gyro}'$.

(E) Modifications in a Case Where a Map Includes an Road Oblique Angle (a) First Modification When the map information of a navigation device includes road oblique angle $\theta_{road}$, the vehicle oblique angle $\theta_{car}$ need not be calculated according to equation (7). That is, the road oblique angle $\theta_{road}$ of a position where a vehicle is located can be adopted as the vehicle oblique angle $\theta_{car}$, and thus sensor sensitivity can be corrected according to the following equation:

$$\text{Sensor Sensitivity}=\{1/(\theta_{sensor}+\theta_{road})\} \times Serror. \quad (13)$$

Moreover, the angular velocity of an angular velocity sensor can be corrected according to the following equation:

$$\omega_{gyro}'=\omega_{gyro} \times \{1/(\theta_{sensor}+\theta_{road})\} \times Serror. \quad (14)$$

When the first modification is adopted, instead of the vehicle oblique angle calculating unit 34 in FIG. 2, a road oblique angle obtaining unit that obtains the road oblique angle $\theta_{road}$ from a map database in the navigation device on the basis of the position of a vehicle is provided in the sensitivity calculating main unit 24.

(b) Second Modification

Moreover, the sensor oblique angle $\theta_{sensor}$ can be obtained using the sensor sensitivity A calculated by the first sensitivity calculating unit 11 and the road oblique angle $\theta_{road}$. Thus, even in a place where GPS radio waves cannot be received, the angular velocity of an angular velocity sensor can be corrected.

That is, sensor sensitivity obtained according to equation (11) is equal to the sensor sensitivity A calculated by the first sensitivity calculating unit 11. Thus, the following equation is formed:

$$A = \{1/(\theta_{sensor} + \theta_{road})\} \times \text{Serror}. \tag{15}$$

In this case, according to equation (3), A=GPS orientation difference/gyro orientation difference. Thus, the following simultaneous equations can be obtained using two sensor sensitivities $A_1$ and $A_2$:

$$A_1 = \{1/\cos(\theta_{sensor} + \theta_{road1})\} \times \text{Serror}_1. \tag{16}$$

$$A_2 = \{1/\cos(\theta_{sensor} + \theta_{road2})\} \times \text{Serror}_2. \tag{17}$$

In this case, when the calculation interval between $A_1$ and $A_2$ is short, it can be supposed that $\text{Serror}_1 = \text{Serror}_2$. Thus, the following equation can be obtained by substituting equation (17) into equation (16):

$$A_1 \times \cos(\theta_{sensor} + \theta_{road1}) = A_2 \times \cos(\theta_{sensor} + \theta_{road2}). \tag{18}$$

A sensor mounting angle can be obtained by solving equation (18) for $\theta_{sensor}$. Moreover, the sensitivity correction value of a gyroscope can be obtained by substituting $\theta_{sensor}$ into equation (16) or (18). When the calculated sensor mounting angle and gyroscope sensitivity error are stored, correction of gyro angular velocity in which a vehicle pitch angle is considered can be performed using a road oblique angle in the map database.

When the second modification is adopted, the sensitivity calculating main unit 24 further includes a $\theta_{sensor}$ calculating unit that calculates $\theta_{sensor}$, following the aforementioned procedure, and the output from the sensor oblique angle calculating unit 33 and the output from the $\theta_{sensor}$ calculating unit are selectively input to the sensitivity calculating unit 35 on the basis of whether GPS radio waves can be received.

(F) Navigation Device

Figure 12:
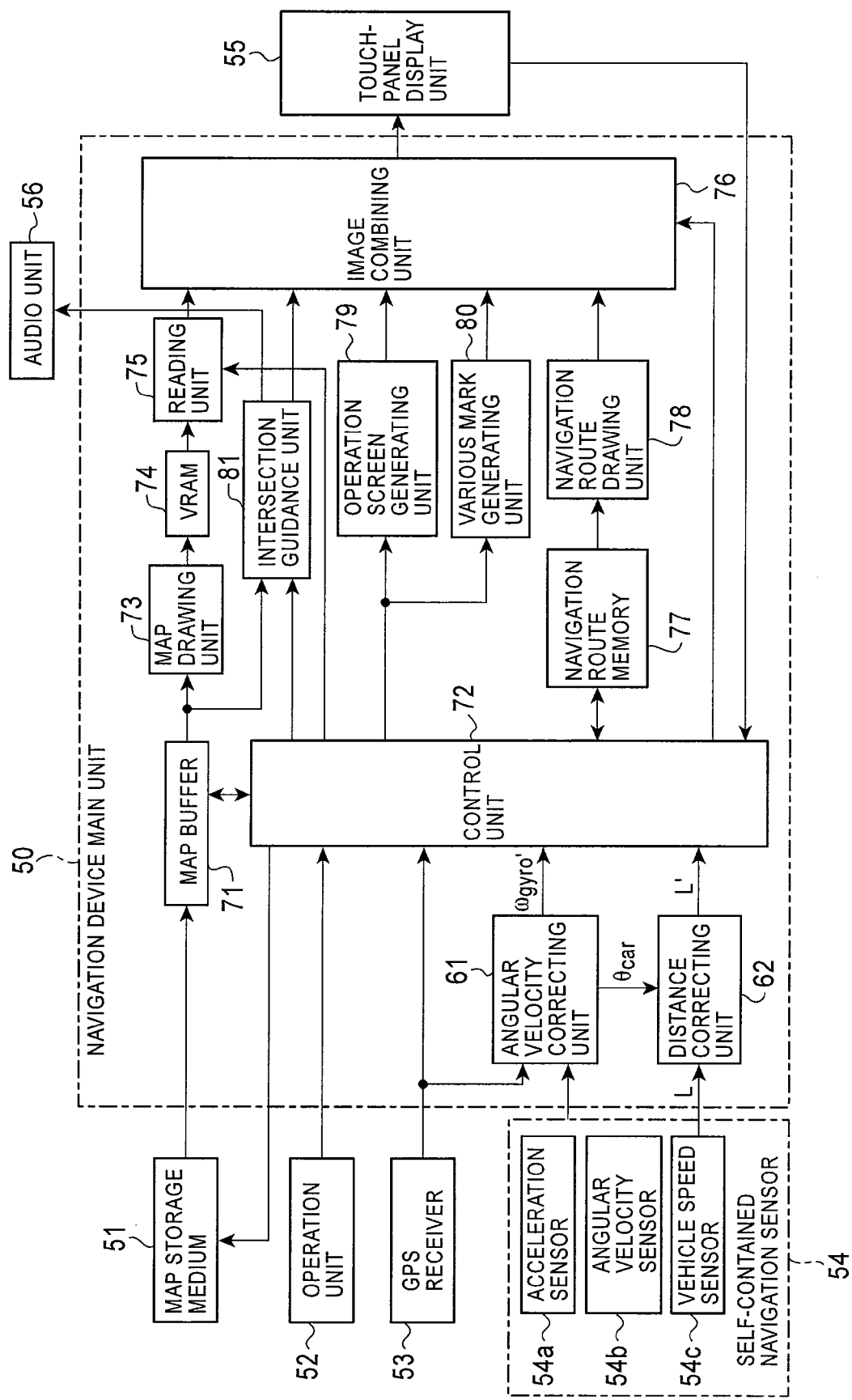
FIG. 12 is a block diagram of a navigation device to which an angular velocity correcting device is applied.

FIG. 12 is a block diagram of one implementation of a navigation device to which the angular velocity correcting device shown in FIG. 10 is applied. Map data is recorded in a map storage medium 51 (for example, a Compact Disc read only memory (CD-ROM) or a Digital Versatile Disc (DVD)) and is read as necessary. An operation unit 52 is used to operate a navigation device main unit 50 and includes, for example, a remote control and hard keys for operation. A GPS receiver 53 receives positional information sent from a GPS satellite and measures the current absolute position of a vehicle. A self-contained navigation sensor 54 includes an acceleration sensor 54a, an angular velocity sensor 54b, and a vehicle speed sensor 54c, and the navigation device main unit 50 can autonomously estimate the current position of the vehicle using output signals from these components. The navigation device main unit 50 estimates the current position of the vehicle by appropriately performing map matching using both the GPS receiver 53 and the self-contained navigation sensor 54.

A touch-panel display unit 55 displays, for example, a map of an area around the vehicle, an enlarged view of an intersection, other types of guidance information, and a menu in response to an instruction from the navigation device main unit 50. Moreover, when a soft key displayed on the screen is pressed, the touch-panel display unit 55 inputs a corresponding predetermined command to the navigation device main unit 50. When the vehicle has approached an intersection, an audio unit 56 outputs a guidance voice for the intersection.

In the navigation device main unit 50, an angular velocity correcting unit 61 includes the components in FIG. 10 and outputs the corrected angular velocity $\omega_{gyro}'$. A travel distance correcting unit 62 corrects vehicle travel distance according to the following equation:

$$L' = L \times \cos\theta_{car}$$

and outputs the corrected travel distance. A map buffer 71 stores map data read from the map storage medium 51. A control unit 72 performs, on the basis of various types of information and commands, for example, (1) control of calculation of the current position of the vehicle, (2) control of reading of the map data of an area around the vehicle into the map buffer 71, (3) navigation route search control, (4) map matching control, and (5) intersection guidance control. A map drawing unit 73 generates a map image using the map data read from the map buffer 71 and writes the map image to a video random access memory (VRAM) 74. An image reading unit 75 cuts out a predetermined image part from the VRAM 74 in response to an instruction from the control unit 72 and inputs the cut-out image part to an image combining unit 76.

A navigation route memory 77 stores information on each navigation route to a destination retrieved by the control unit 72, i.e., the navigation route memory 77 stores pieces of data of the respective positions of all nodes that constitute each navigation route in order in which the vehicle passes through the nodes from a start point to the destination. A navigation route drawing unit 78 generates a navigation route image using the navigation route information and inputs the navigation route image to the image combining unit 76 to highlight the navigation route image on the drawn map. An operation screen generating unit 79 generates various types of menu screens (operation screens) and inputs the menu screens to the image combining unit 76. A various mark generating unit 80 generates various types of marks, for example, a vehicle position mark and a cursor, and inputs the marks to the image combining unit 76. An intersection guidance unit 81 performs guidance for an intersection approached by the vehicle using a display image and sound. Specifically, in actual navigation, when the vehicle approaches an intersection, so that the distance between the vehicle and the intersection is less than a predetermined distance, the intersection guidance unit 81 displays a guidance map for the intersection (for example, an enlarged view of the intersection and an arrow indicating the travel direction) on the display screen and indicates the travel direction by voice. The image combining unit 76 superimposes, for example, the various types of marks, the navigation route image, and the enlarged view of the intersection on the map image read from the VRAM 74 as necessary to display the map image on the display screen.

A position calculating unit in the control unit 72 calculates the relative rotation angle $\theta_i$ of the vehicle using the angular velocity $\omega_{gyro}'$ input from the angular velocity correcting unit 61 for each travel distance $L_0$ and calculates relative travel distances $X_i$ and $Y_i$ in respective axis directions according to the following equations:

$$X_i = L_0 \times \cos\theta_i, \text{ and}$$

$$Y_i = L_0 \times \sin\theta_i.$$

Then, absolute vehicle orientation θ and individual axis positions X and Y in total are updated using $\theta_i$, $X_i$, and $Y_i$ according to the following equations:

$$\theta = \theta + \theta_i,$$

$$X = X + X_i, \text{ and}$$

$$Y = Y + Y_i.$$

(G) Advantageous Effects of the Present Invention

Figure 13A:
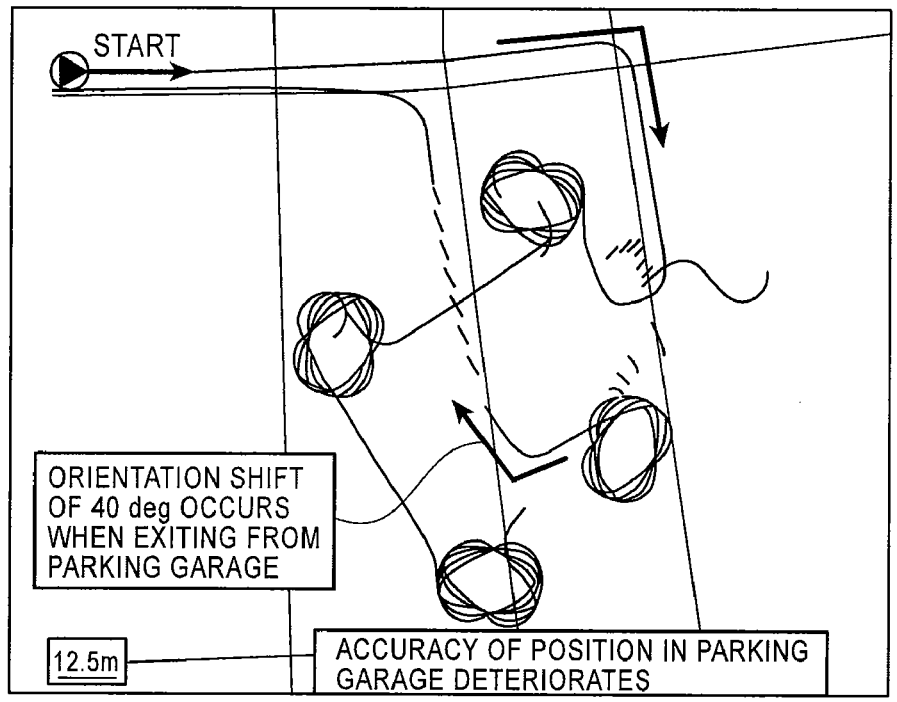
FIGS. 13A and 13B show positions of a vehicle measured when the vehicle is in a multistory parking garage and positions of the vehicle measured after the vehicle exits from the multistory parking garage.
Figure 13B:
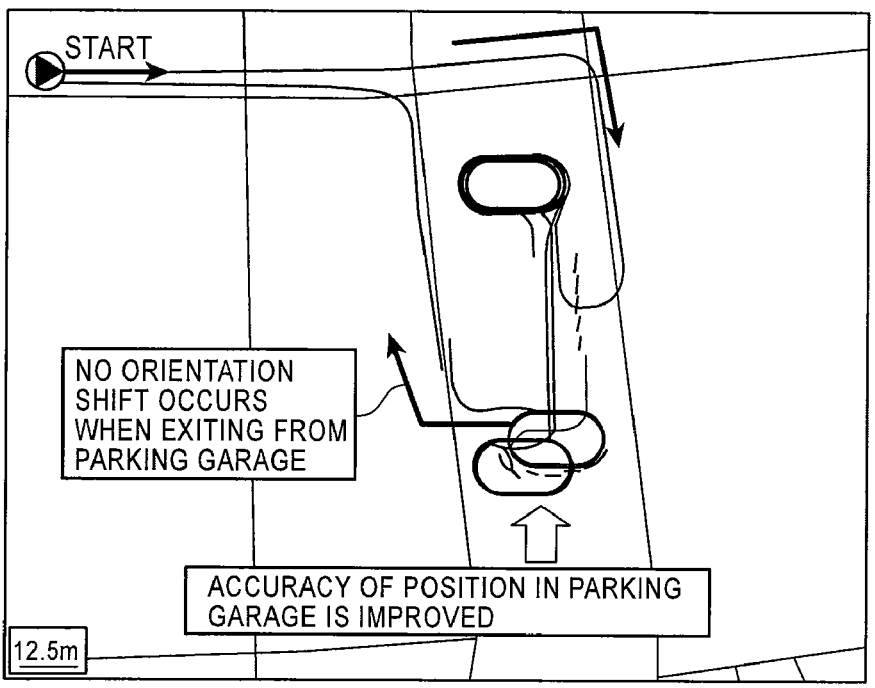

FIGS. 13A and 13B show positions of a vehicle measured when the vehicle is in a multistory parking garage and positions of the vehicle measured after the vehicle exits from the multistory parking garage. FIG. 13A shows a case where angular velocity is corrected using only the sensitivity correction value B output from the second sensitivity calculating unit 12. FIG. 13B shows a case where the present embodiment is applied. In the case shown in FIG. 13A, the sensitivity of a gyroscope is about 23.5 mV/(deg/s) and greatly deviates from a standard value of 25 mV/(deg/s). This deviation corresponds to a gyro angular velocity error of +6% with respect to the standard value of 25 mV/(deg/s). Thus, in the parking garage, the accuracy of the vehicle position apparently deteriorates, resulting in an orientation shift when the vehicle exits from the parking garage. In the case shown in FIG. 13A, an orientation shift of 40 deg occurs when the vehicle exits from the parking garage.

In contrast, in the present embodiment, the sensitivity error of the gyroscope is corrected, and angular velocity correction and distance correction are performed even in the parking garage. Thus, the accuracy of the vehicle position in the parking garage is greatly improved, so that an orientation shift that occurs when the vehicle exits from the parking garage is almost equal to zero.

While the description has been given, citing the embodiment, the embodiment is just an exemplary embodiment of the present invention and does not limit the interpretation of the technical scope of the present invention. That is, the present invention can be embodied in various forms without departing from the spirit or essential characteristics thereof. It is therefore intended that the foregoing detailed description be regarded as illustrative rather than limiting, and that it be understood that it is the following claims, including all equivalents, that are intended to define the spirit and scope of this invention.

What is claimed is:

1. An angular velocity correcting method for correcting sensitivity of an angular velocity detecting sensor that is mounted in a vehicle and detects angular velocity of the vehicle, and for correcting angular velocity output from the angular velocity detecting sensor using the corrected sensitivity, the angular velocity correcting method comprising the steps of:
    enabling a first sensor sensitivity correcting method and a second sensor sensitivity correcting method, the first sensor sensitivity correcting method for considering variation of sensor sensitivity due to an oblique angle of the angular velocity detecting sensor with respect to a horizontal plane and a sensitivity error of the angular velocity detecting sensor and correcting the sensor sensitivity, and the second sensor sensitivity correcting method for considering the variation of the sensor sensitivity due to the oblique angle of the angular velocity detecting sensor with respect to the horizontal plane without considering the sensitivity error of the angular velocity detecting sensor and correcting the sensor sensitivity;
    calculating the sensitivity error of the angular velocity detecting sensor on the basis of a ratio of the sensor sensitivity obtained by the first sensor sensitivity correcting method to the sensor sensitivity obtained by the second sensor sensitivity correcting method; and
    correcting the angular velocity output from the angular velocity detecting sensor using the sensitivity error.

2. The angular velocity correcting method according to claim 1, wherein the sensor sensitivity is corrected by multiplying the sensor sensitivity obtained by the second sensor sensitivity correcting method by the calculated sensitivity error; and
    wherein the angular velocity is corrected by multiplying the angular velocity output from the angular velocity detecting sensor by the corrected sensor sensitivity.

3. The angular velocity correcting method according to claim 1, wherein the first sensor sensitivity correcting method corrects the sensor sensitivity so that sensor orientation obtained from the angular velocity detecting sensor agrees with GPS orientation obtained from GPS radio waves; and
    wherein when the angular velocity detecting sensor and an acceleration sensor are mounted on the same plane, the second sensor sensitivity correcting method calculates an oblique angle $\theta_{acc}$ of the acceleration sensor with respect to the horizontal plane using an output signal from the acceleration sensor and a vehicle speed pulse output from a distance sensor, and corrects the sensor sensitivity due to the oblique angle of the angular velocity detecting sensor with respect to the horizontal plane using the oblique angle $\theta_{acc}$.

4. The angular velocity correcting method according to claim 3, wherein the second sensor sensitivity correcting method calculates a GPS oblique angle $\theta_{gps}$ that is obtained from GPS radio waves and is an oblique angle of the vehicle with respect to the horizontal plane, calculates an oblique angle $\theta_{sensor}$ of the angular velocity detecting sensor with respect to a travel direction of the vehicle from the oblique angle $\theta_{acc}$ and the GPS oblique angle $\theta_{gps}$, calculates a vehicle oblique angle $\theta_{car}$ that is an oblique angle of the vehicle with respect to the horizontal plane from the oblique angle $\theta_{acc}$ and the oblique angle $\theta_{sensor}$, and outputs $1/\cos(\theta_{sensor} + \theta_{car})$ as the sensor sensitivity.

5. The angular velocity correcting method according to claim 1, wherein the first sensor sensitivity correcting method corrects the sensor sensitivity so that sensor orientation obtained from the angular velocity detecting sensor agrees with GPS orientation obtained from GPS radio waves; and
    the second sensor sensitivity correcting method obtains, as a vehicle oblique angle $\theta_{car}$, a road oblique angle of a position of the vehicle from road oblique angle information included in a map database, and outputs $1/\cos(\theta_{sensor} + \theta_{car})$ as the sensor sensitivity using the vehicle oblique angle $\theta_{car}$ and an oblique angle $\theta_{sensor}$ of the angular velocity detecting sensor with respect to a travel direction of the vehicle.

6. The angular velocity correcting method according to claim 1, wherein monitoring is performed to determine whether a condition that reliability of a GPS is high and an oblique angle of the vehicle with respect to the horizontal plane is close to zero degree is satisfied; and
    wherein, the sensitivity error is calculated when the condition is satisfied.

7. An angular velocity correcting device that corrects sensitivity of an angular velocity detecting sensor that is mounted in a vehicle and detects angular velocity of the vehicle and corrects angular velocity output from the angular velocity detecting sensor using the corrected sensitivity, the angular velocity correcting device comprising:
- a first sensor sensitivity calculating unit that, considering variation of sensor sensitivity due to an oblique angle of the angular velocity detecting sensor with respect to a horizontal plane and a sensitivity error of the angular velocity detecting sensor, corrects the sensor sensitivity;
- a second sensor sensitivity calculating unit that, considering the variation of the sensor sensitivity due to the oblique angle of the angular velocity detecting sensor with respect to the horizontal plane without considering the sensitivity error of the angular velocity detecting sensor, corrects the sensor sensitivity;
- a sensitivity error calculating unit that calculates and outputs, as the sensitivity error of the angular velocity detecting sensor, a ratio of the sensor sensitivity obtained by the first sensor sensitivity calculating unit to the sensor sensitivity obtained by the second sensor sensitivity calculating unit; and
- an angular velocity correcting unit that corrects the angular velocity output from the angular velocity detecting sensor using the sensitivity error.

8. The angular velocity correcting device according to claim 7, further comprising a sensitivity correcting unit that corrects the sensor sensitivity by multiplying the sensor sensitivity obtained by the second sensor sensitivity calculating unit by the calculated sensitivity error;
wherein the angular velocity correcting unit corrects the angular velocity by multiplying the angular velocity output from the angular velocity detecting sensor by the corrected sensor sensitivity.

9. The angular velocity correcting device according to claim 7, wherein the first sensor sensitivity calculating unit comprises means for correcting the sensor sensitivity so that sensor orientation obtained from the angular velocity detecting sensor agrees with GPS orientation obtained from GPS radio waves, and
wherein the second sensor sensitivity calculating unit comprises:
- an oblique angle calculating unit that, when the angular velocity detecting sensor and an acceleration sensor are mounted on the same plane, calculates an oblique angle $\theta_{acc}$ of the acceleration sensor with respect to the horizontal plane using an output signal from the acceleration sensor and a vehicle speed pulse output from a distance sensor; and
- a sensor error calculating unit that corrects the sensor sensitivity due to the oblique angle of the angular velocity detecting sensor with respect to the horizontal plane using the oblique angle $\theta_{acc}$.

10. The angular velocity correcting device according to claim 9, wherein the second sensor sensitivity calculating unit further comprises:
- a GPS oblique angle calculating unit that calculates a GPS oblique angle $\theta_{gps}$ that is obtained from GPS radio waves and is an oblique angle of the vehicle with respect to the horizontal plane;
- a sensor oblique angle calculating unit that calculates an oblique angle $\theta_{sensor}$ of the angular velocity detecting sensor with respect to a travel direction of the vehicle from the oblique angle $\theta_{acc}$ and the GPS oblique angle $\theta_{gps}$; and
- a vehicle oblique angle calculating unit that calculates a vehicle oblique angle $\theta_{car}$ that is an oblique angle of the vehicle with respect to the horizontal plane from the oblique angle $\theta_{acc}$ and the oblique angle $\theta_{sensor}$;
wherein the second sensor sensitivity calculating unit outputs $1/\cos(\theta_{sensor}+\theta_{car})$ as the sensor sensitivity.

11. The angular velocity correcting device according to claim 7, wherein the first sensor sensitivity calculating unit includes means for correcting the sensor sensitivity so that sensor orientation obtained from the angular velocity detecting sensor agrees with GPS orientation obtained from GPS radio waves;
wherein the second sensor sensitivity calculating unit includes a vehicle oblique angle obtaining unit that obtains, as a vehicle oblique angle $\theta_{car}$, a road oblique angle of a position of the vehicle from road oblique angle information included in a map database; and
wherein the second sensor sensitivity calculating unit outputs $1/\cos(\theta_{sensor}\,\theta_{car})$ as the sensor sensitivity using the vehicle oblique angle $\theta_{car}$ and an oblique angle $\theta_{sensor}$ of the angular velocity detecting sensor with respect to a travel direction of the vehicle.

12. The angular velocity correcting device according to claim 7, further comprising:
- a GPS reliability determining unit that determines reliability of a GPS; and
- a monitoring unit that monitors whether an oblique angle of the vehicle with respect to the horizontal plane is close to zero degree;
wherein, when the reliability of the GPS is high and the oblique angle of the vehicle with respect to the horizontal plane is close to zero degree, the sensitivity error calculating unit calculates the sensitivity error.

13. A navigation device that includes a GPS receiver, an angular velocity sensor, an acceleration sensor, and a vehicle speed sensor, the navigation device including a function of detecting a position and orientation of a vehicle using respective output values from the GPS receiver, the angular velocity sensor, the acceleration sensor, and the vehicle speed sensor, the navigation device comprising:
- a first sensor sensitivity calculating unit that, considering variation of sensor sensitivity due to an oblique angle of an angular velocity detecting sensor with respect to a horizontal plane and a sensitivity error of the angular velocity detecting sensor, corrects the sensor sensitivity;
- a second sensor sensitivity calculating unit that, considering the variation of the sensor sensitivity due to the oblique angle of the angular velocity detecting sensor with respect to the horizontal plane without considering the sensitivity error of the angular velocity detecting sensor, corrects the sensor sensitivity;
- a sensitivity error calculating unit that calculates and outputs, as the sensitivity error of the angular velocity detecting sensor, a ratio of the sensor sensitivity obtained by the first sensor sensitivity calculating unit to the sensor sensitivity obtained by the second sensor sensitivity calculating unit;
- an angular velocity correcting unit that corrects the angular velocity output from the angular velocity detecting sensor using the sensitivity error; and
- a vehicle position calculating unit that calculates a position of the vehicle using the corrected angular velocity and output from the vehicle speed sensor.

14. The navigation device according to claim 13, further comprising:
- a sensitivity correcting unit that corrects the sensor sensitivity by multiplying the sensor sensitivity obtained by the second sensor sensitivity calculating unit by the calculated sensitivity error;

wherein the angular velocity correcting unit corrects the angular velocity by multiplying the angular velocity output from the angular velocity detecting sensor by the corrected sensor sensitivity.

15. The navigation device according to claim 13, wherein the first sensor sensitivity calculating unit comprises means for correcting the sensor sensitivity so that sensor orientation obtained from the angular velocity detecting sensor agrees with GPS orientation obtained from GPS radio waves; and wherein the second sensor sensitivity calculating unit comprises:

an oblique angle calculating unit that, when the angular velocity detecting sensor and an acceleration sensor are mounted on the same plane, calculates an oblique angle $\theta_{acc}$ of the acceleration sensor with respect to the horizontal plane using an output signal from the acceleration sensor and a vehicle speed pulse output from a distance sensor; and a sensor sensitivity correcting unit that corrects the sensor sensitivity due to the oblique angle of the angular velocity detecting sensor with respect to the horizontal plane using the oblique angle $\theta_{acc}$.

16. The navigation device according to claim 15, wherein the second sensor sensitivity calculating unit further comprises:

a GPS oblique angle calculating unit that calculates a GPS oblique angle $\theta_{gps}$ that is obtained from GPS radio waves and is an oblique angle of the vehicle with respect to the horizontal plane;

a sensor oblique angle calculating unit that calculates an oblique angle $\theta_{sensor}$ of the angular velocity detecting sensor with respect to a travel direction of the vehicle from the oblique angle $\theta_{acc}$ and the GPS oblique angle and a vehicle oblique angle calculating unit that calculates a vehicle oblique angle $\theta_{car}$ that is an oblique angle of the vehicle with respect to the horizontal plane from the oblique angle $\theta_{acc}$ and the oblique angle $\theta_{sensor}$;

wherein the sensor sensitivity correcting unit outputs 1/cos $(\theta_{sensor}+\theta_{car})$ as the sensor sensitivity.

17. The navigation device according to claim 13, further comprising:

a GPS reliability determining unit that determines reliability of a GPS; and a monitoring unit that monitors whether an oblique angle of the vehicle with respect to the horizontal plane is close to zero degree, wherein, when the reliability of the GPS is high and the oblique angle of the vehicle with respect to the horizontal plane is close to zero degree, the sensitivity error calculating unit calculates the sensitivity error.

* * * * *